United States Patent [19]

Wedeniwski

[11] Patent Number: 4,905,418
[45] Date of Patent: Mar. 6, 1990

[54] PROCESS FOR GRINDING CAMS OF A CAMSHAFT

[75] Inventor: Horst J. Wedeniwski, Remshalden-Grunbach, Fed. Rep. of Germany

[73] Assignee: Fortuna-Werke Maschinenfabrik GmbH, Fed. Rep. of Germany

[21] Appl. No.: 352,127

[22] Filed: May 15, 1989

[30] Foreign Application Priority Data

May 19, 1988 [DE] Fed. Rep. of Germany ....... 3816997
Sep. 10, 1988 [DE] Fed. Rep. of Germany ....... 3830854

[51] Int. Cl.$^4$ ................................................. B24B 1/00
[52] U.S. Cl. ................................. 51/165.71; 51/281 C
[58] Field of Search ......... 51/165.71, 165 EC, 281 C, 51/48 R

[56] References Cited

U.S. PATENT DOCUMENTS 4,603,514  8/1986  Suzuki et al. ..................... 51/281 C
4,621,463  11/1986  Komatsu et al. .................. 51/281 C

OTHER PUBLICATIONS

Werkstatt und Betrieb, 118 (1985) 8 pp. 443–448.
Werkstatt und Betrieb, 119 (1986) 8 pp. 655–660.
Werkstatt und Betrieb, 120 (1987) 4 pp. 269–274.
Werkstatt und Betrieb, 121 (1988) 3 pp. 201–206.
Yegenoglu Dissertation "Berechnung Von Topographiekenngrossen zur Auslegung Von CBN-Schleifprozessen 1986".

Primary Examiner—Frederick R. Schmidt
Assistant Examiner—M. Rachuba
Attorney, Agent, or Firm—Walter A. Hackler

[57] ABSTRACT

A process is applied for grinding cams of a camshaft (12) by means of a numerically controlled camshaft grinding machine (10). The camshaft (12) is arranged in a workpiece mounting (11) rotatably at preset angular velocity ($\omega$) in predetermined angle steps about its longitudinal axis. A grinding wheel slide (17) with a grinding wheel (18) is infeedable in an axis (20) vertical to the longitudinal axis in preset steps. A grinding wheel (18) is selected as to its condition for machining as a function of the geometry, the material and the required surface condition of the camshaft (12) and cams (30), and the infeed of the grinding wheel (18) is set.

In order to achieve a minimum grinding time while taking into account various process-related restrictions, a maximum possible infeed for a minimum grinding time is determined using the maximum relative metal removal rate and the preset cam geometry, and—if necessary taking into account restrictions with regard to the chip cavity repletion conditions and the grain load—the maximum infeed for grinding the camshaft (12) is set (FIG. 1).

10 Claims, 17 Drawing Sheets $$t_h = \frac{V'_w}{Q'_w}$$

$$= \frac{a \cdot b' \cdot (\rho_G \cdot R_G + 2 \cdot \rho_F \cdot \sum_{K=1}^{n} R_{FK} \cdot K^{-1} + \rho_S \cdot R_S) \cdot \frac{\pi}{180}}{Q'_w}$$

Fig. 10/1
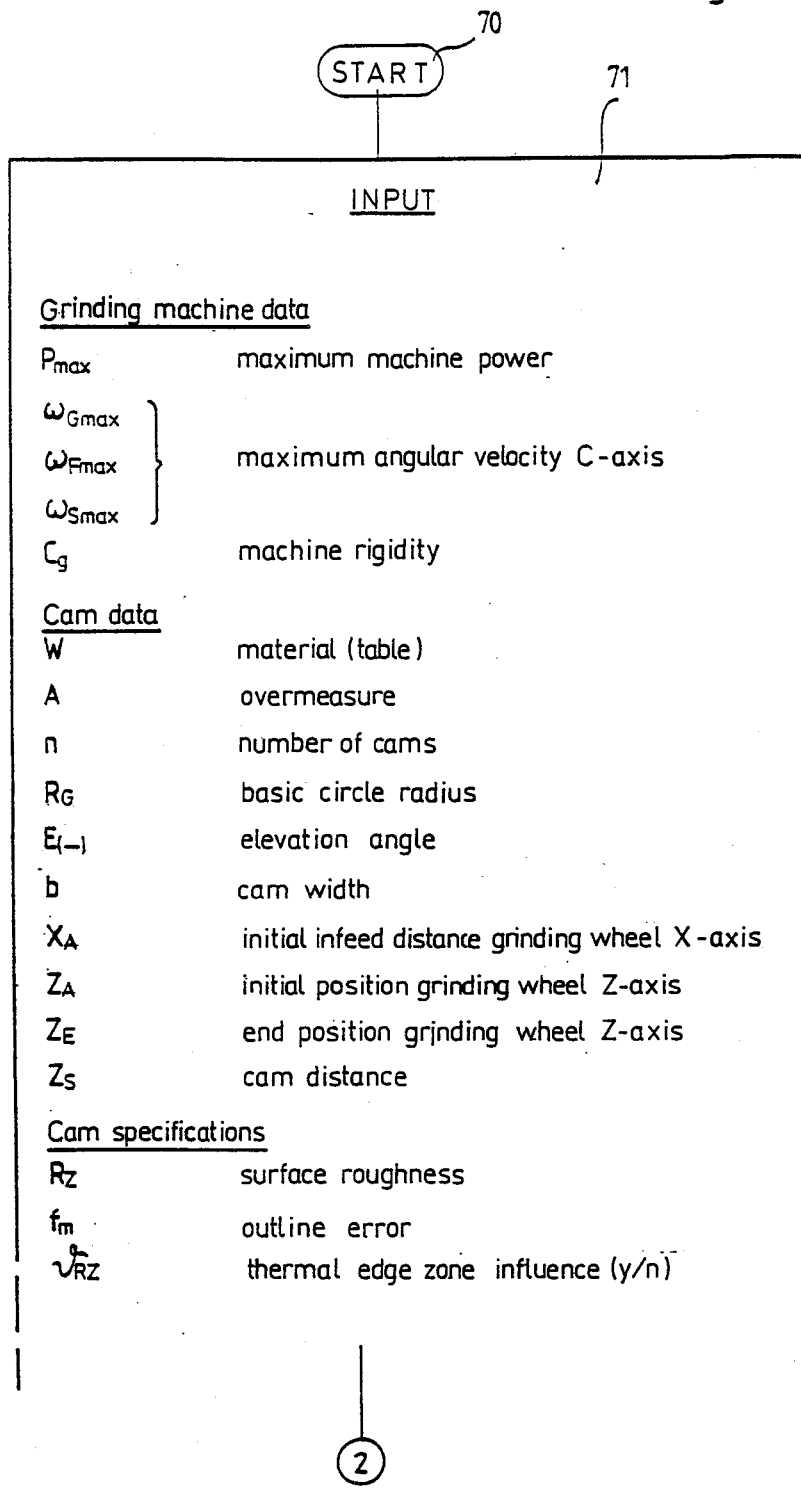

Grinding wheel data

| | |
|---|---|
| $d_S$ | grinding wheel diameter |
| $d_K, K$ | grain size / concentration (table) |
| $q_m$ | polyhedron constant (octahedron: 1,4) |
| $W_m$ | theoretical polyhedron volume |
| $\Delta b_S$ | grain lap factor |
| $F_{Kzul}$ | maximal permissible grain force |
| $a_d$ | dressing position |
| $v_{fd}, v_{fd}$ | dressing roll speed |

Constant machining parameter

| | |
|---|---|
| $v_S$ | peripheral grinding wheel speed |
| $N_w$ | number of machined workpieces per hour |
| $T_S$ | conditioning intervals grinding wheel |

Constants

| | |
|---|---|
| $m_1$ | $n_1$ |
| $p_1$ | $m_2$ |
| $n_2$ | $p_2$ |
| $y$ | $K_1 \ldots K_n$ |

~71

↓

CALCULATE

From elevation value table ~72

| | |
|---|---|
| $d_w = 2 \cdot R_G$ | workpiece diameter |
| $R_F$ | flange radius (table) |
| $R_S$ | peak radius |
| $E_{max}$ | maximum elevation value |
| $\varphi_G$ | basic circle angle |
| $\varphi_F$ | flange angle |
| $\varphi_S$ | peak angle |

↓

(3)

Fig.10/3
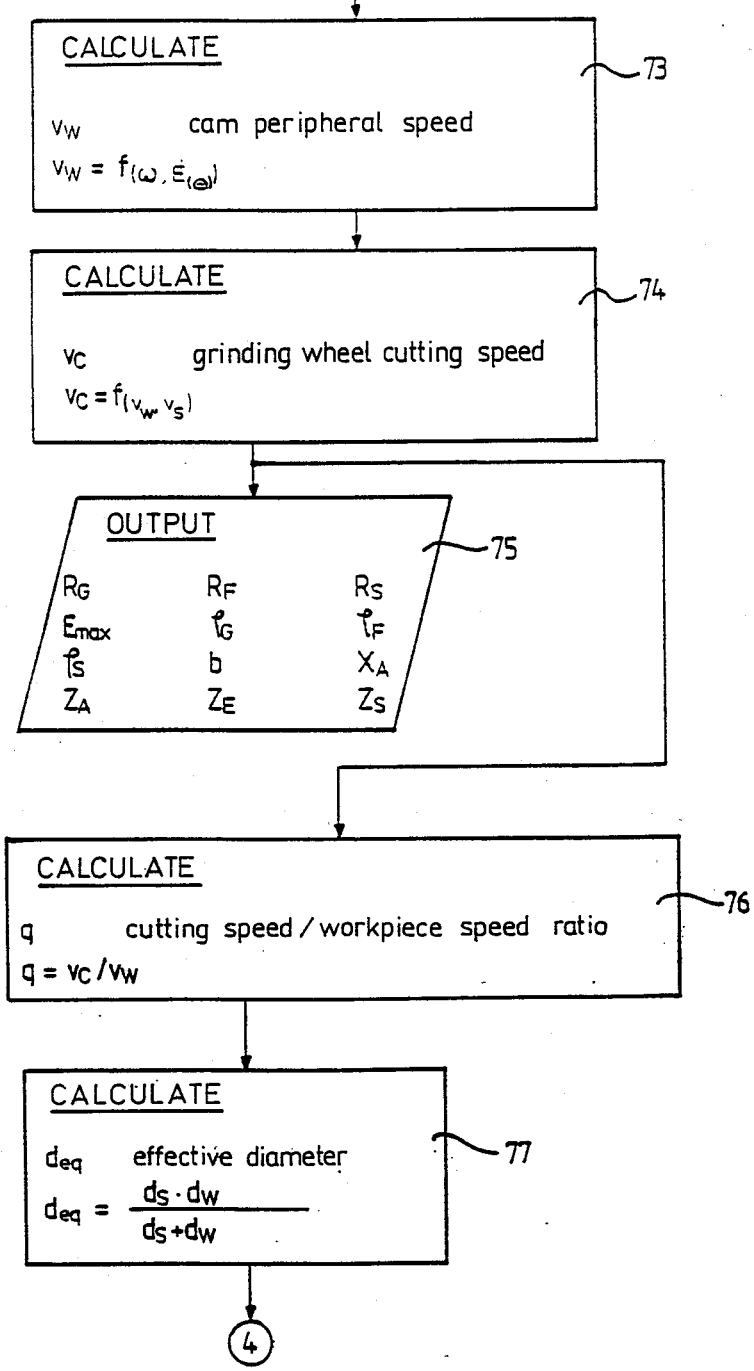

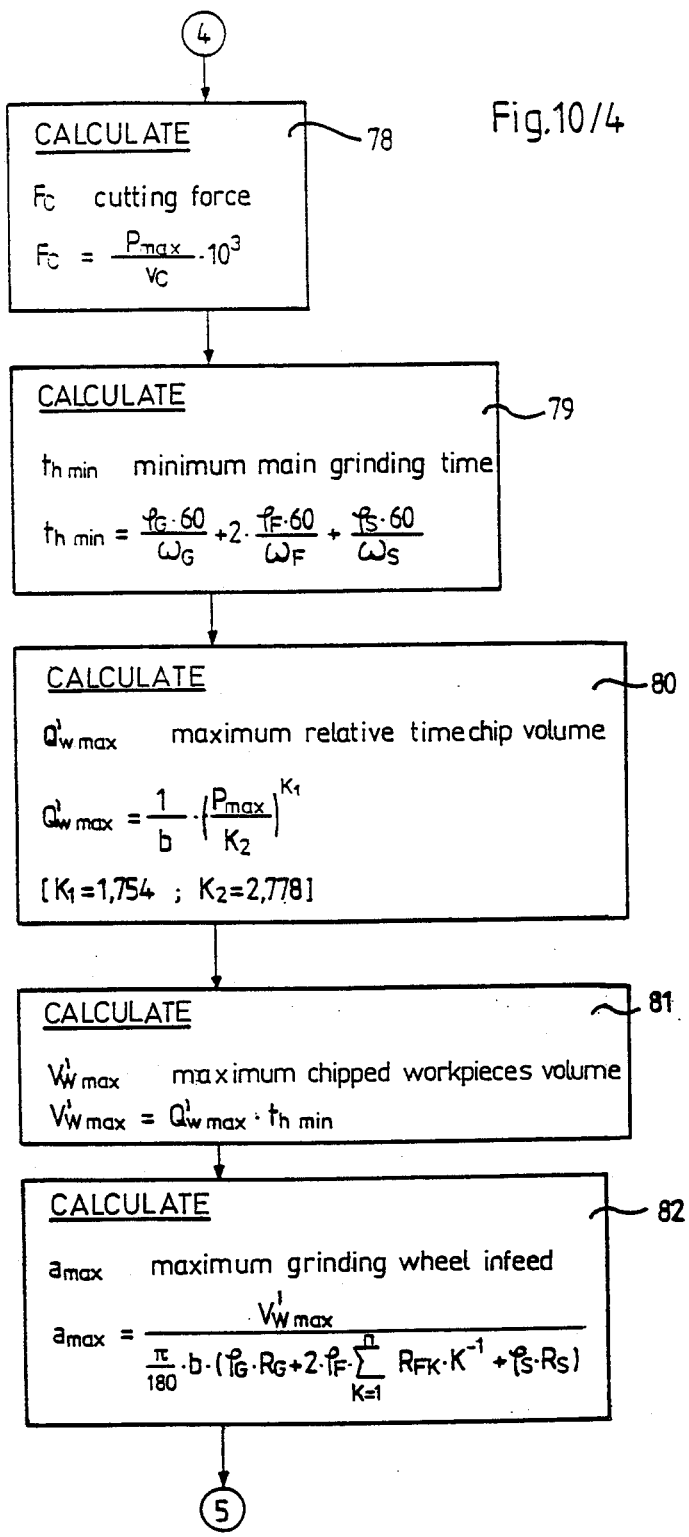
Fig.10/4

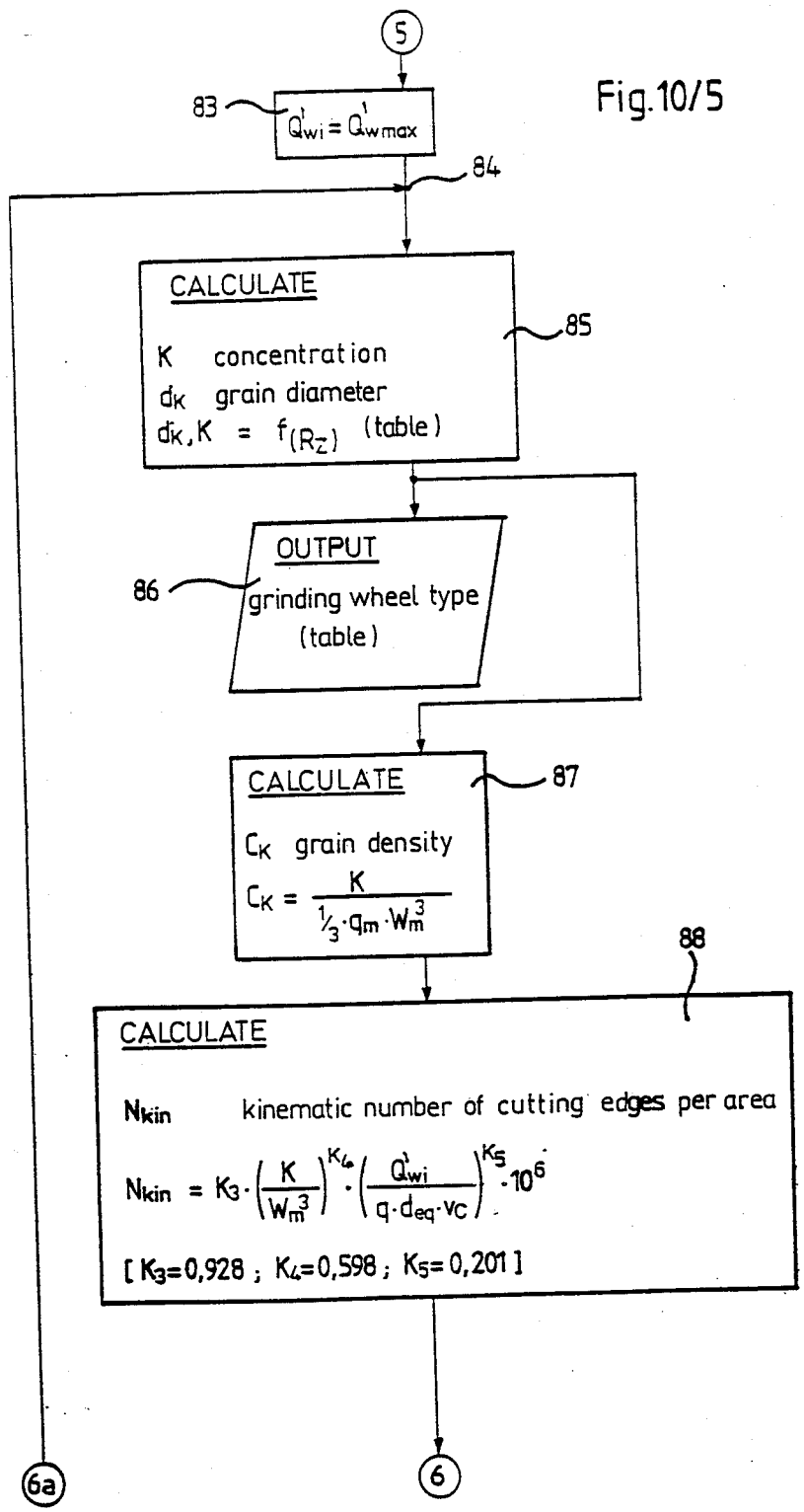
Fig.10/5

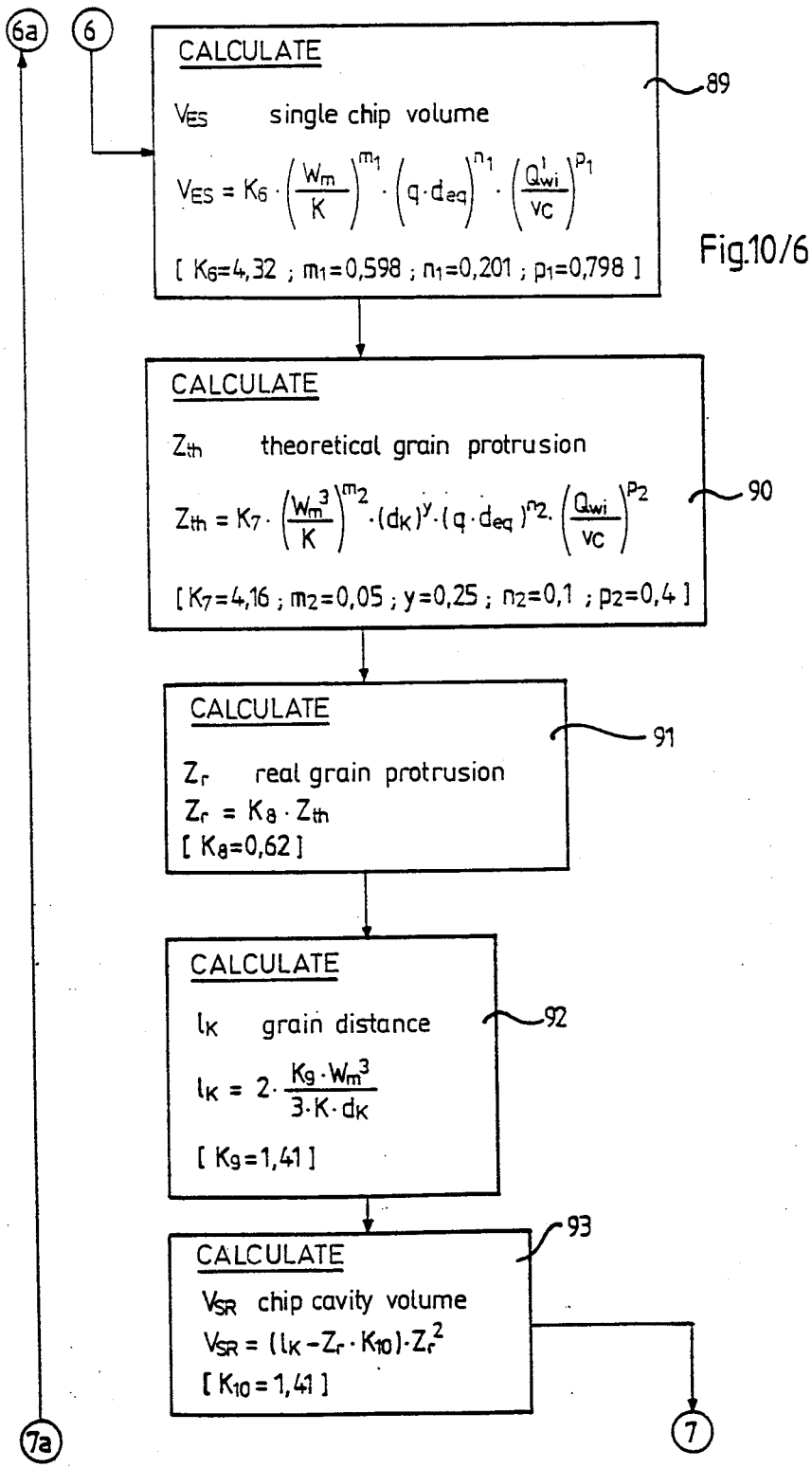
Fig.10/6

Fig.10/7
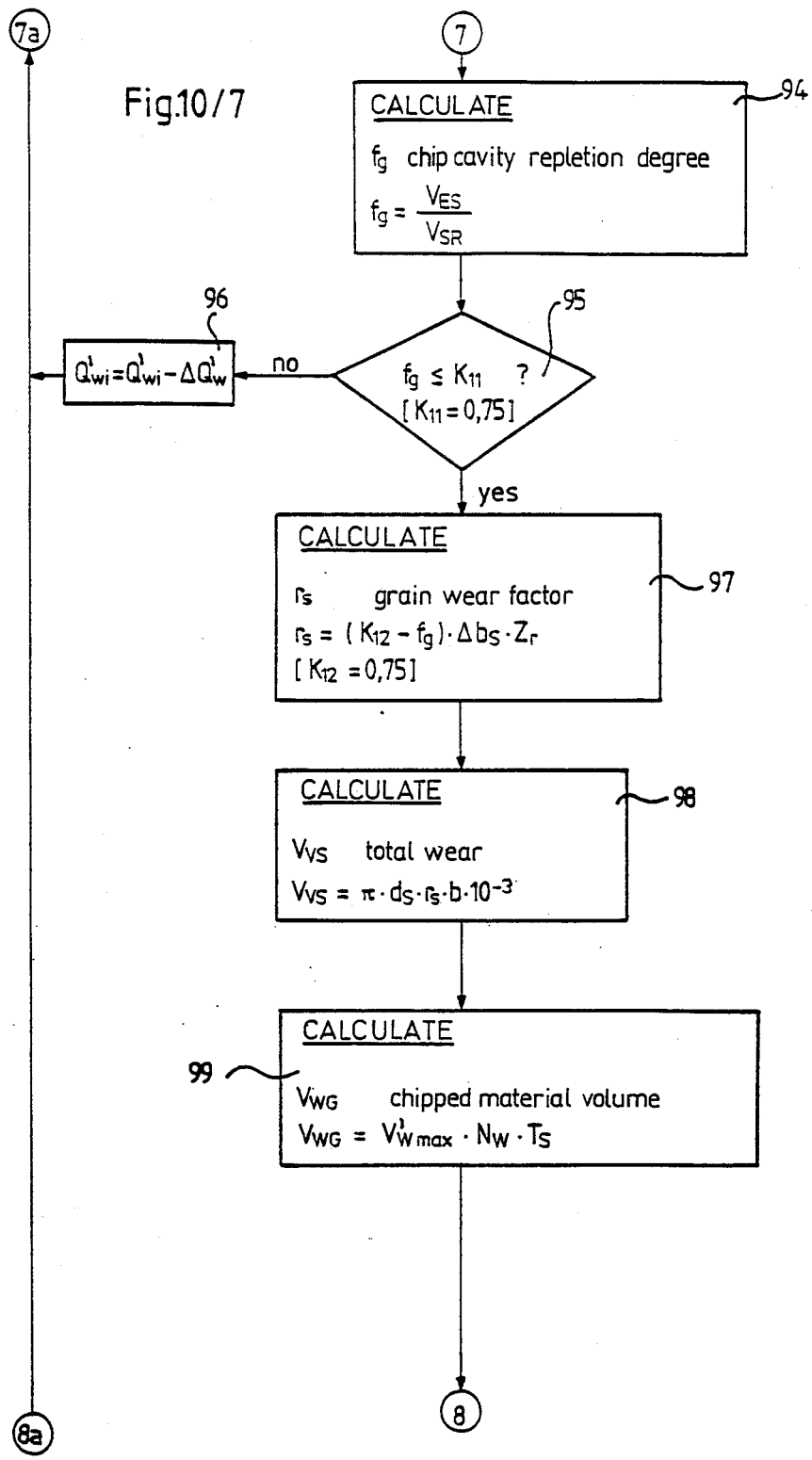

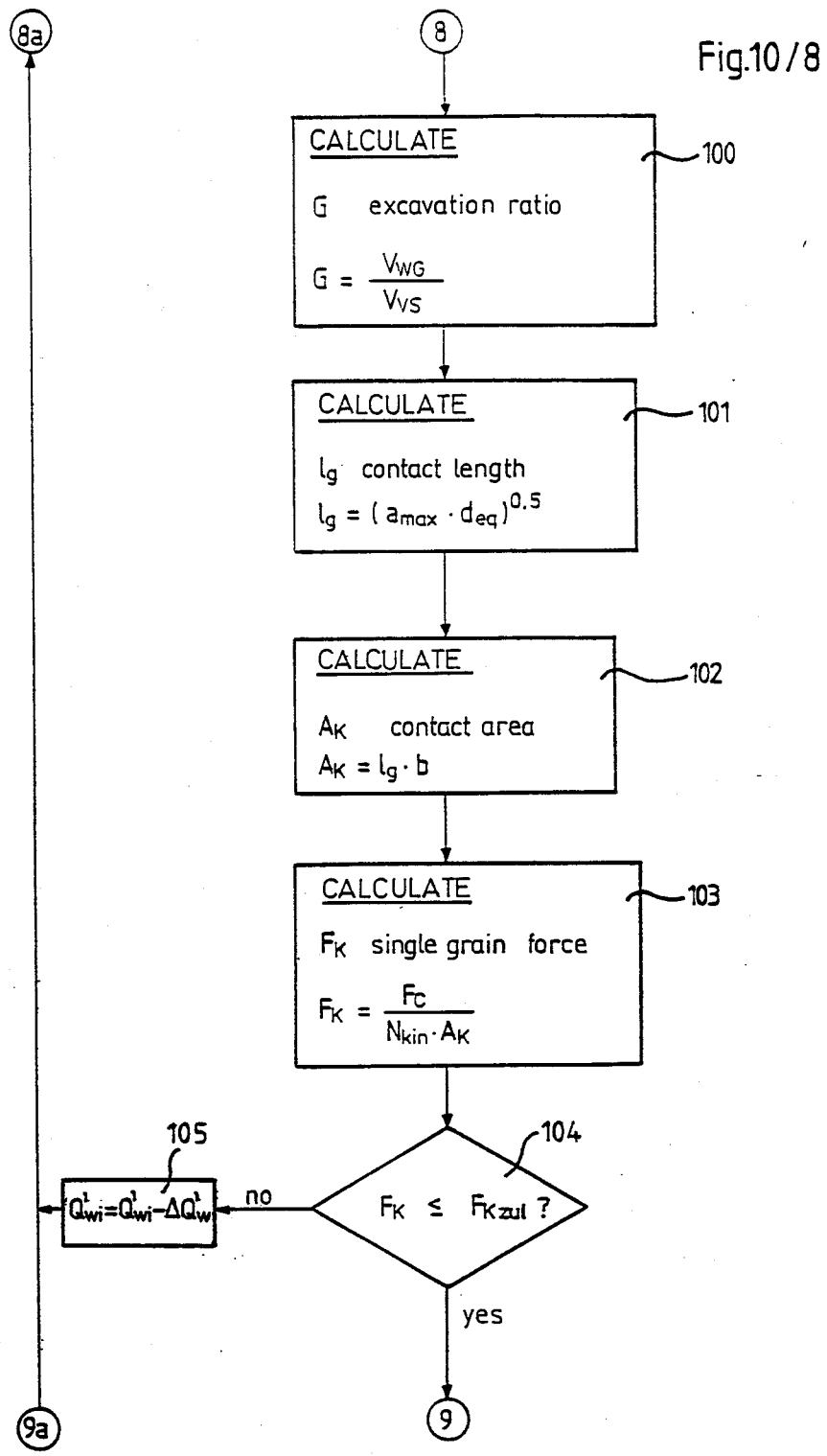
Fig.10/8

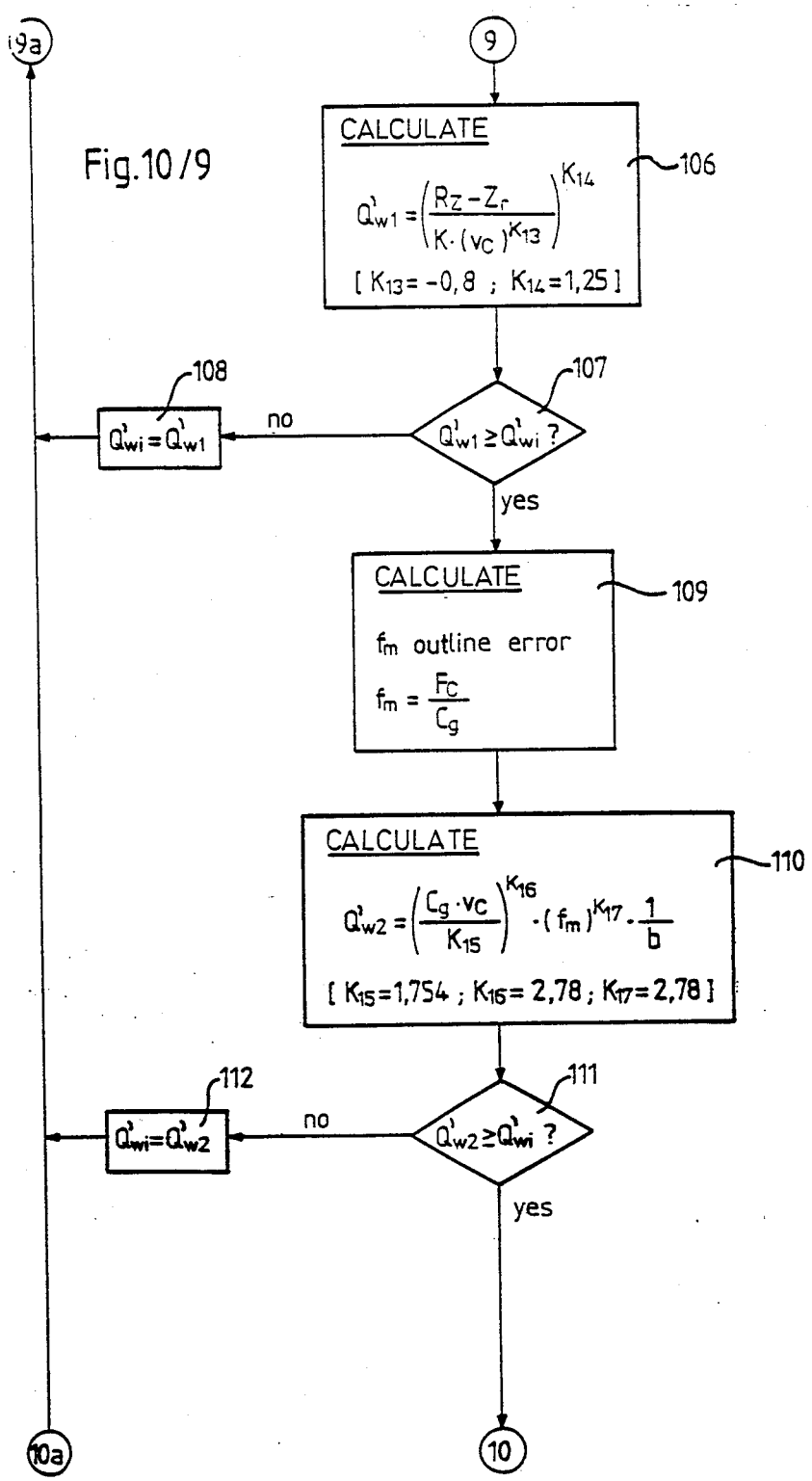
Fig.10/9

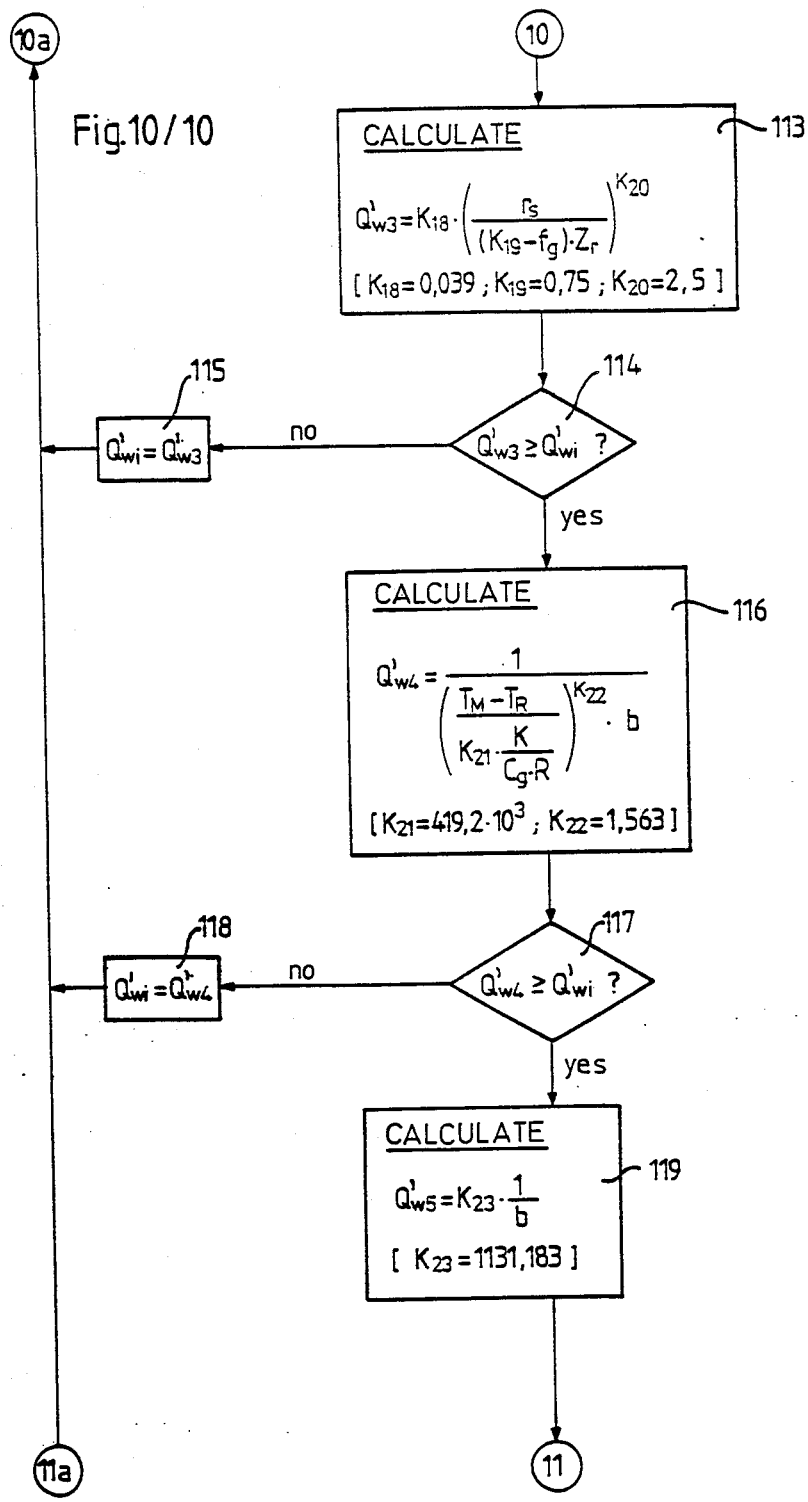
Fig.10/10

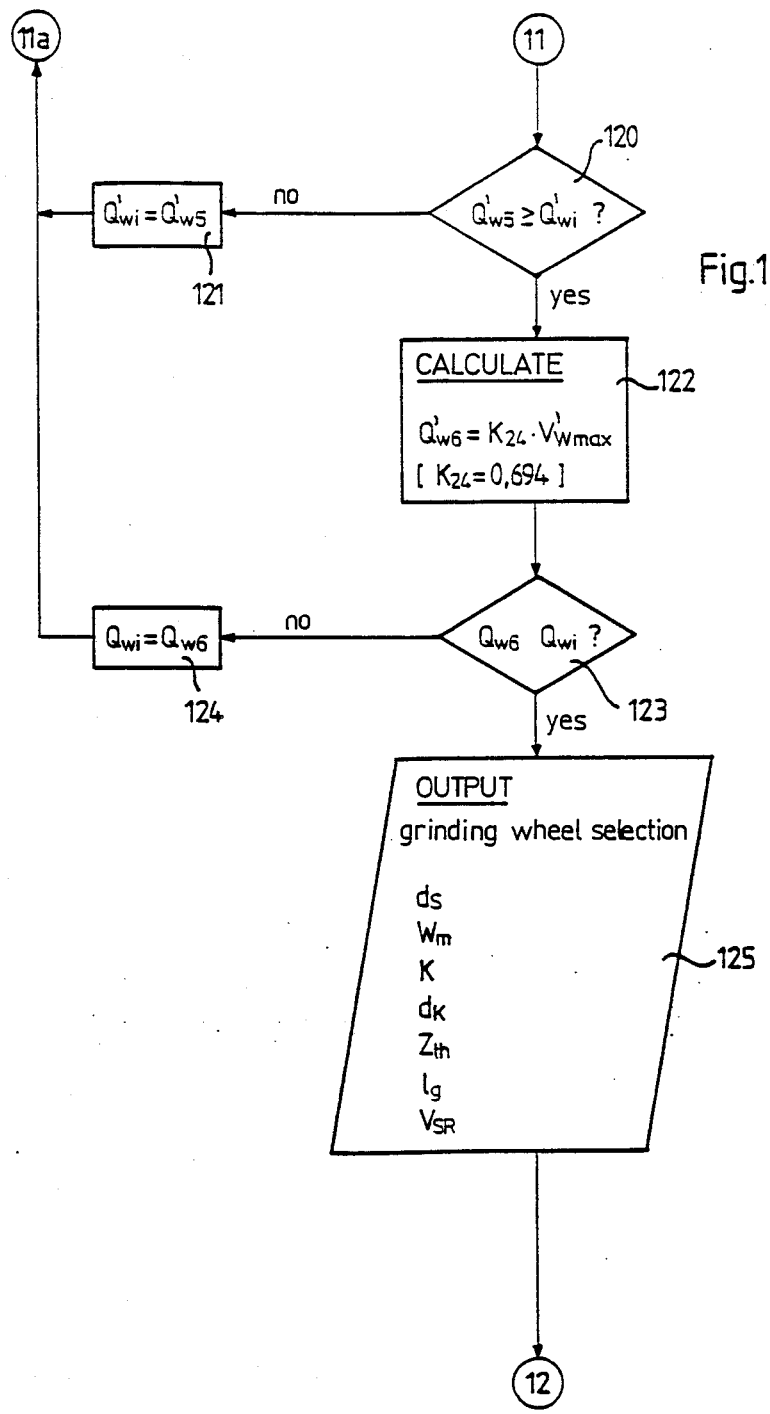
Fig.10/11

Fig.10/12
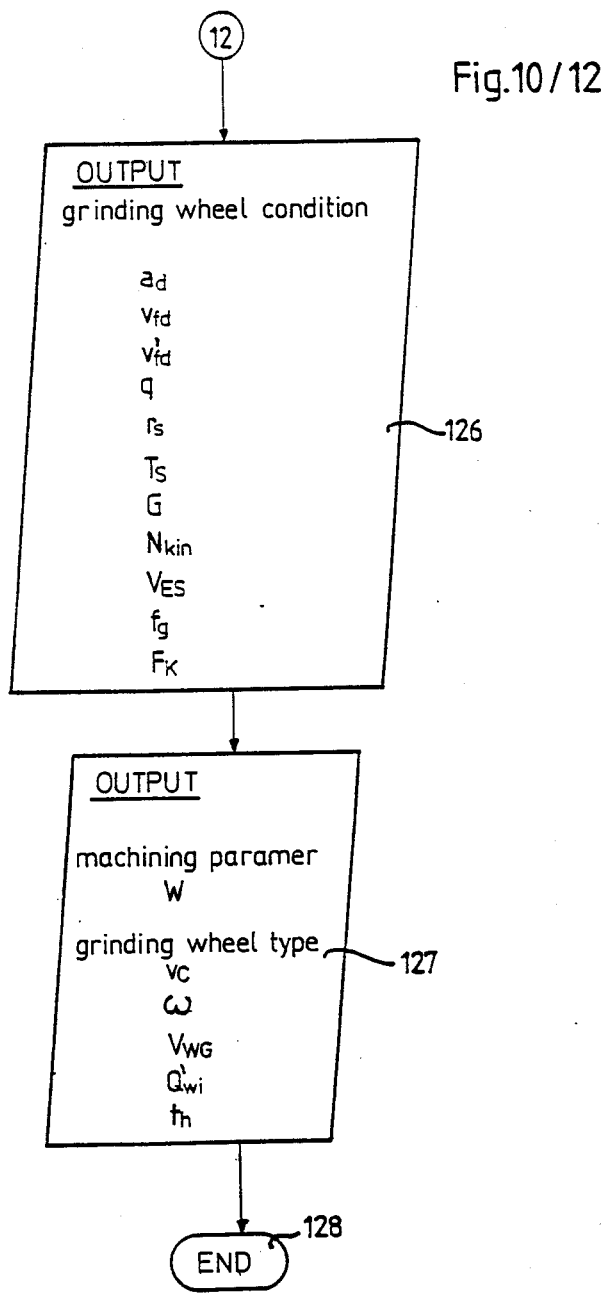

PROCESS FOR GRINDING CAMS OF A CAMSHAFT

The invention relates to a process for grinding of cams of a camshaft by means of a numerically-controlled camshaft grinding machine, whereby the camshaft is arranged in a workpiece mounting rotatably at preset angular velocity in predetermined angle steps about its longitudinal axis, and whereby a grinding wheel slide with a grinding wheel is infeedable in an axis vertical to the longitudinal axis in preset steps, with a grinding wheel being selected as to its condition for machining as a function of the geometry, the material and the required surface condition of the camshaft and cams, and with the infeed of the grinding wheel being set.

A process of the above type is generally known. In the publication "Werkstatt und Betrieb", 1985, pages 443 to 448; 1986, pages 655 to 660; 1987, pages 269 to 274; and 1988, pages 201 to 206, various methods are described by which production cam contour grinding machines are controlled as a function of various parameters, including the geometry of the cams and of the camshaft, and of the material used.

Finally, the dissertation by Yegenoglu "Berechnung von Topographiekenngrößen zur Auslegung von CBN-Schleifprozessen" (calculation of topography characteristics for design of CBN grinding processes), Fakultät für Maschinenwesen of the Rheinisch-Westfälische Technische Hochschule in Aachen, 1986 indicates a mathematical model for determining topography characteristics of external cylindrical grinding processes and for deriving therefrom strategies for process selection.

In the process mentioned at the outset and used for cam contour grinding, an attempt was made to fix certain individual aspects of cam contour grinding using mathematical models and to derive therefrom process parameters, however the main focus of these efforts was trueness to shape, i.e. dimensional accuracy of the ground cams, while economic criteria were taken into account at best marginally.

In the study by Yegenoglu, economic aspects are dealt with, but this known model relates to general external cylindrical grinding processes, and there is no unified system for converting the model concepts found into a production strategy.

The object underlying the invention, by contrast, is to develop a process of the type mentioned at the outset such that the physical mechanisms of cam contour grinding are brought into a closed loop of action and counteraction with tool specifications and process parameters, in order to find an optimum under economic aspects—i.e. with minimum grinding time—and with as full an exploitation as possible of what is technically feasible.

This object is attained in accordance with the invention by the following process steps:

Determination of a minimum grinding time from the geometry of the cams and from the maximum angular velocity;

Determination of a maximum relative metal removal rate as a function of the maximum drive output of the grinding wheel drive;

Determination of a maximum chipped workpiece volume from the minimum grinding time and from the maximum relative metal removal rate;

Determination of a maximum infeed from the maximum chipped workpiece volume and the geometry of the cams;

Determination of a grinding wheel type from a table of preset grinding wheel types as a function of the preset surface roughness of the cams;

Grinding of the cams by means of the determined grinding wheel with setting of the maximum infeed.

The object underlying the invention is completely resolved in this manner. For the first time, the two most critical quantities of the grinding process form the starting point, namely the maximum possible angular velocity of the so-called C-axis on the one hand and the drive output of the grinding wheel on the other, in order to ascertain via the specific geometry of the cams of the camshaft a maximum relative metal removal rate as the critical characteristic quantity of the process in accordance with the invention. This maximum relative metal removal rate then determines in its turn the maximum infeed, via the geometry of the cams, in such a way that when this infeed is set the grinding machine is operated right at the limit of its possible performance. By presetting a finite quantity of actually available grinding wheels, an appropriate grinding wheel can then be determined depending on the required surface quality, i.e. depending on the required surface roughness, in order to then proceed with the cam contour grinding process.

In a preferred further embodiment of the process in accordance with the invention, the following steps are then applied in addition:

Determination of the chip cavity repletion degree from the maximum relative metal removal rate;

Comparison of the determined chip cavity repletion degree with a limit value;

Reduction of the maximum relative metal removal rate until the chip cavity repletion degree does not exceed the limit value;

Determination of the appropriate maximum infeed from the reduced maximum relative metal removal rate;

Grinding of the cams using the determined grinding wheel with setting of the maximum infeed.

These measures have the advantage that in addition to the already mentioned limit data of the maximum angular velocity in the C-axis and the power of the grinding wheel drive, the physical process of stock removal is taken into account by the cutting edges of the grains of the grinding wheel, such that the chip cavity repletion degree, i.e. the ratio of single chip volume and chip cavity volume, should not exceed a certain limit value. Here too, the topography of the grinding wheel above the chip cavity between the grains of the grinding wheel on the one hand, and the size of the removed material chips on the other, are incorporated as physical processes.

In a further preferred embodiment of the invention, the following further steps are employed:

Determination of the single grain force from the maximum relative metal removal rate;

Comparison of the determined single grain force with a second limit value;

Reduction of the maximum relative metal removal rate until the single grain force does not exceed the second limit value;

Determination of the appropriate maximum infeed from the reduced maximum relative metal removal rate;

Grinding of the cams using the determined grinding wheel with setting of the maximum infeed.

These measures have the advantage that the loading capacity of the grains of the grinding wheel is used as a further process parameter to prevent premature excessive wear of the grinding wheel occurring when the grinding capacity is too high. In this instance too, a certain reduction in the grinding capacity is accepted in the interests of meeting this secondary condition.

In a further preferred embodiment of the process in accordance with the invention, a maximum relative metal removal rate is determined from a further boundary condition and the metal removal rate which is greater is used for determination of the maximum infeed for grinding the cams.

This measure has the advantage that in addition to the already mentioned boundary conditions, further boundary conditions are again taken into account via the central process quantity, i.e. the maximum relative metal removal rate, and are the result of empirically determined relationships. In this instance too, therefore, a certain reduction in the grinding capacity, i.e. an increase in the machining time, is accepted in the interests of allowing for further boundary conditions, in order to meet further boundary conditions depending on their expediency.

These additional boundary conditions can be, in further embodiments of the process in accordance with the invention, the surface roughness of cams and grinding wheel, or the outline error of cams, or the cutting capacity of the camshaft grinding machine, or the grinding wheel wear, or the edge zone temperature of the cams, or the chipped workpiece volume.

When all the above boundary conditions are taken into account as limits to the achievable optimum for the grinding time, a unified concept for cam contour grinding is finally arrived at, in which what is theoretically possible with the combination of cam contour grinding machine, grinding wheel, conditioning of the grinding wheel and workpiece is achieved with regard to the geometry and material. It is now possible to selectively neglect individual boundary conditions in order to then achieve a further reduction of the grinding time while accepting certain restrictions.

The process in accordance with the invention is particularly suitable for user-controlled operation of a cam contour grinding machine using a VDU menu control with graphic interactive mode, where the grinding machine user is given one VDU mask after the other on which he can insert the missing characteristic values of the machining operation in question. The numerical control of the grinding machine then selects from the permanently set and variable input parameters the optimum grinding wheel from a stored catalogue of actually available grinding wheels and sets automatically the necessary process parameters of the cam contour grinding machine, in particular the C-axis motion, i.e. the rotary axis of the camshaft, and the X-axis motion, i.e. the travel of the grinding wheel slide.

It has become clear in practical tests that the optimization of grinding processes achievable with the process in accordance with the invention leads to a drastic reduction in the grinding times, so that camshafts can be ground in the production process with a considerably increased output, while the grinding wheel is subjected simultaneously to an optimally low wear and the conditioning of the grinding wheel is also optimally integrated into the grinding process.

Further advantages are indicated in the description and in the enclosed drawing.

It is understood that the above features and the features mentioned below are not only usable in the stated combination, but also in different combinations or in isolation, without leaving the scope of the present invention.

Embodiments of the invention are shown in the drawing and are explained in the following description.

Figure 1:
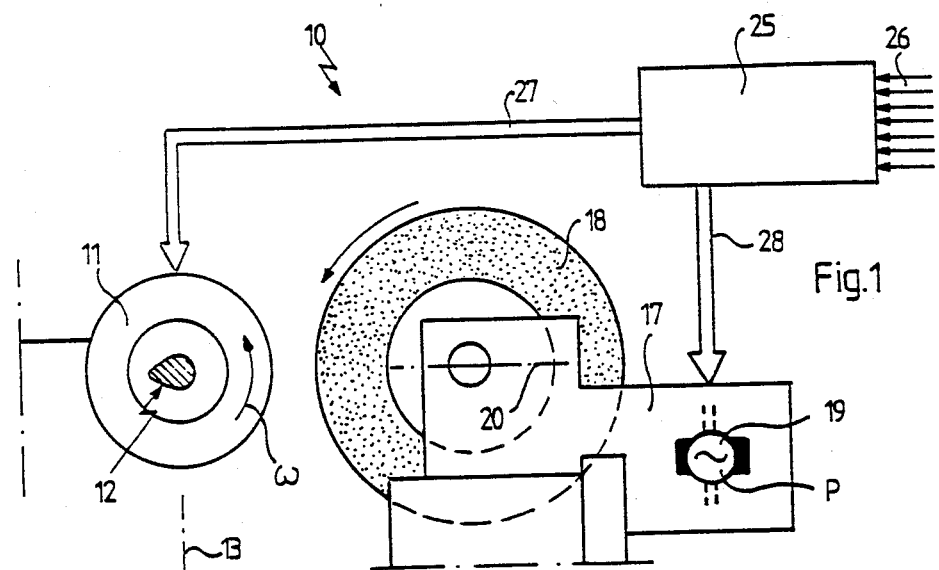
FIG. 1 is a side view, extremely stylized and partially in section along the line I—I of FIG. 2, of a cam contour grinding machine as can be used to implement the process in accordance with the invention.

FIGS. 10/1 to 10/12 are a flow diagram illustrating an embodiment of the process in accordance with the invention.

The process in accordance with the invention has the aim of converting the machining task, taking into account the material, the unmachined-part and machined-part geometry, and the surface quality, into a machining concept in which a prediction of the tool specification, the conditioning quantities, the technology parameters, the process sequence and the machining time can be given without carrying out experimental trial sequences. The information determined for contour grinding of the camshaft is made available to the control unit of a cam contour grinding machine in a form permitting editing of the proposed numerical control program in accordance with DIN 66025.

The process in accordance with the invention preferably relates to the field of CBN grinding in which grinding wheels with an abrasive coating of CBN (cubic boron nitride) crystals are used. A quantitative connection between the physical processes of CBN cam contour grinding as a closed loop of action and counteraction and the process parameters of the cam contour grinding machine is created.

For this purpose, the machining task is first defined. As the input quantity, the workpiece with material, overmeasure and geometry is preset. As a disturbance, the criteria with vibrations and temperature are preset, and finally the limit criteria, i.e. outline errors and surface quality, are defined as the output quantity.

From the machining task follows the technology, both for the machining kinematics and for the machining kinetics. By the former is understood the process quantities infeed, chipped volume, angular velocity, cutting speed, contact length and the equivalent grinding wheel diameter as setting quantities, while the latter involves the metal removal rate, the angular velocity, the cutting force, the output, the process duration, the wear and the dynamic rigidity as process quantities.

From the machining task and the technology, the tool is then determined according to its rating and conditioning. By the former is understood the state variables of the specification and of the topography, while by the latter is understood the core quantities, i.e. infeed and speed strategy of dressing.

From technology and tool follows last of all the machining concept, for which can be issued as a record the result quantities, i.e. cutting value optimization for minimum grinding time and the control quantities for the NC program according to unmachined part/machined part description, production data, machining sequence, conditioning strategy and implementation instruction.

In summary, this means that in the process in accordance with the invention first the workpiece characteristic data (material, overmeasure and geometry) are preset as input quantities and the limit criteria (outline errors of cam contour, surface quality, thermal edge zone influence) as output quantities, in order to determine therefrom the machining strategy. As a consequence of the relationships between machining kinematics as setting quantities with numerical consideration of the rating of a grinding wheel topography, and machining kinetics as process quantities, a machining concept is defined such that a minimum grinding time is made possible with optimum cutting values which as result quantities determine the NC program as the control quantity. An essential feature of the proposed process is putting into concrete form the physical active mechanism of the machining process with an analytical view of the cutting edge movement during grinding, and the interaction of the various components at the cutting point.

The process in accordance with the invention is shown preferably as a graphic interactive dialog at the cam contour grinding machine in a manner easily handled by the user of the grinding machine. It is then possible in an advantageous manner to first preset a material group, since experience shows that the camshafts to be ground only comprise a finite numbers of materials. The user of the grinding machine therefore only needs to enter a code number to preset a certain standardized material. The geometry characteristics of the cam contour are kinetodynamically analysed by means of multiple derivation according to the time, and shown as process parameters, as is known per se.

The tool paths in the X-axis and the Z-axis vertical thereto are also graphically illustrated and can be preset by the user of the grinding machine depending on the application.

When considering the machining kinematics, it is assumed that the grinding wheel moves with its peripheral cutting edges relative to the workpiece on an orthohypocycloid whose path results from the superposition of the peripheral speed of the grinding wheel and the workpiece speed. The subsequent orthohypocycloids lead during surface generation in the contact area to stock removal of which the magnitudes determined by the infeed, the chipped volume, the contact length and the equivalent grinding wheel diameter.

The preset surface roughness of the cam contour to be machined defines the grain size and thus the concentration of the CBN grinding wheel.

To summarize, first the theoretical grain protrusion is derived and then the chip cavity volume is determined using the grain distance. It is assumed here that the CBN grain in the grinding wheel bond is bound by cylindrical bonding webs that anchor the grain with a rigidity that is a function of the module of elasticity ($2-10\times 10^4$ N/mm$^2$), the bending strength (25–150 N/mm$^2$) and the compressive strength (100–1000 N/mm$^2$) in the bond. The important thing here is that within the scope of the present process, preferably ceramic bonds of CBN grains are considered.

In the grain distribution model taken as the basis, it is assumed that the grains in a statistical cutting edge distribution are in a quadratic arrangement on concentric planes. This affords the possibility of calculating the area-based kinematic number of cutting edges, the grain density and the chip cavity repletion degree, in order to then match the characteristics of the grinding wheel topography to the machining kinetics. Using the calculated tool data, a CBN grinding wheel with its identification is recommended from the tool file.

The conditioning parameters are determined on the basis of the theoretical grain wear and the theoretical stock removal ratio.

Overall, an optimization strategy is pursued with the aim of achieving a minimum grinding time while complying with certain secondary conditions, and thereby of describing exactly the cutting data.

Finally, the determined values are shown in graphic interactive dialog for the user of the cam contour grinding machine in the form of a record.

Before the specific properties of the embodiment of the process in accordance with the invention are described, the fundamental physical model should first be explained in detail. Reference is also made to the dissertation by Yegenoglu already mentioned, in which further details on the physical processes in CBN grinding may be found.

The parameters of a multiple-stage grinding process determining as a control quantity the machine setting for cam contour grinding using the plunge process are the cutting speed $v_c$, the workpiece angular velocity $\omega_w$, and the infeed per workpiece revolution a.

The cutting speed $v_c$ can be regarded as a constant parameter determined in a multi-stage process to fit the respective grinding task. The cutting speed corresponds in the first approximation to the peripheral speed of the grinding wheel. The cutting speed $v_c$ can be obtained via the cosine law with the relationship:

$$V_c^2 = \sqrt{v_s^2 + v_w^2 - 2\, v_s\, v_w \cos\alpha} \;\; \text{(m/s)} \qquad [1]$$

where $$v_w = 2\pi r_i \cdot n/60{,}000 \;\; \text{(m/s)} \qquad [2]$$

with $$n = \omega_w/360 \;\; \text{(rpm)} \qquad [3]$$

In practice the values are generally $v_c = 60$–140 m/s. Compared with the cutting speed, the workpiece peripheral speed $v_w$ is generally at least two powers of ten lower, and the speed ratio is given with the equation:

$$q = v_c/v_w \qquad [4]$$

The length of the arc of action is obtained from the curvatures of grinding wheel and workpiece and from the radial feed. The radial feed corresponds to the infeed amount of the grinding wheel per workpiece revolution. The geometric length $l_g$ over which each cutting edge is in engagement with the workpiece is calculated with $$l_g = \sqrt{a\, d_{eq}} \quad (mm) \qquad [5]$$

with $$d_{eq} = \frac{d_s\, d_w}{d_s + d_w} \quad (mm) \qquad [6]$$

Contact lengths in cam contour grinding are usually between $l_g = 0.1$–15 mm. Greater values are obtained in particular at the cam flank.

The chipped volume is given by the cam geometry and the infeed per workpiece revolution:

$$v = a \cdot b \cdot \left( \phi_G \cdot R_G + 2 \cdot \phi_F \cdot \sum_{K=1}^{n} R_K \cdot K^{-1} + \phi_S \cdot R_S \cdot \frac{\pi}{180} \right) \quad (mm^3) \qquad [7]$$

where b is the cam width, $_G$ the basic circle angle, $R_G$ the basic circle radius, $_F$ the flank angle, $R_K$ the flank radius for one interval, $_S$ the peak angle and $R_S$ the peak radius. The grinding time per cam revolution can be calculated using the equation $$t_h = (\phi_G \cdot 60)/\omega_G + 2(\phi \cdot 60)/\omega_F + (\phi_S \cdot 60)/\omega_S \qquad [8]$$

The following applies for the machining kinetics:

With the given grinding overmeasure, it is important when roughing to remove as much material as possible in very short time without fear of thermal edge zone damage.

The metal removal rate can be calculated from the chipped volume and the grinding time per cam revolution:

$$Q_{wi} = \frac{V_{wi}}{t_{hi}} \quad (mm^3/s) \qquad [9]$$

Based on a grinding wheel width of 1 mm, the following applies:

$$Q_{wi}' = \frac{Q_{wi}}{b} \quad (mm^3/s\, mm) \qquad [10]$$

Usual relative metal removal rates are in the range of $Q'_w = 0.1$–5 mm³/mms during finishing. Surface roughnesses $R_z = 0.5$ μm to 4 μm are achievable here. In roughing, extremely high metal removal rates $Q_w' = 85$–110 mm³ are possible. These values depend on the material, the grain size, the concentration and the load on the cutting edges.

From the metal removal rate $Q_w'$, the cutting capacity can be calculated. The equation obtained is:

$$P_c = K \cdot Q_w n \qquad [11]$$

Here, k indicates a constant and n an exponential coefficient that takes into account for the respective workpiece the relative ratio between chip formation and friction energy.

A comparison of the constant k and the exponent n for the same material class, namely chilled cast iron, pearlitic ferritic cast iron and malleable cast iron shows that the type of conditioning of the grinding tool represents a distinction in its sizes:

For example, in down-conditioning without sharpening k = 1.903 and n = 0.384 applies, and in down-conditioning with sharpening k = 1.824 and n = 0.384, while in up-conditioning without sharpening k = 1.869 and n = 0.36 applies, and in up-conditioning with sharpening k = 1.754 and n = 0.36.

The cause for this phenomenon can be found in the chip volume formation and in the generation of the cutting edge geometry.

The specific cutting energy $$e_c = \left( \frac{P_c}{Q_w} \right) \cdot 10^3 \quad (J/mm^3) \qquad [12]$$

can be represented in similar fashion as a function of the metal removal rate.

The cutting force with a constant metal removal rate is given by the equation $$F_c \left( = \frac{P_c}{v_c} \right) \cdot 10^3 \quad (N) \qquad [13]$$

With constant cutting capacity and increasing cutting speed, the cutting force drops degressively. This correlation is, in the final analysis, due to the reduction of the chip cross-section.

The cutting force is determined as the sum of the individual forces which are currently acting on the cutting edges in the cut. The individual force components of a collective of cutting edges of a grinding wheel in external plunge-grinding are the cutting tangential force $F_{ct}$ and the cutting normal force $F_{cn}$.

The cutting force $F_c$ can then be described by the correlation $$F_c = \sqrt{F_{ct}^2 + F_{cn}^2} \quad (N) \qquad [14]$$

The cutting normal force $F_{cn}$ can be determined by the relationship $$F_{cn} = \frac{F_{ct}}{\mu} \quad (N) \qquad [15]$$

where the proportionality factor $\mu$ represents the cutting force ratio $$\mu = \frac{F_{ct}}{F_{cn}} \qquad [16]$$

Since μm is determined by the chip formation mechanisms on the grain cutting edges, the cutting force ratio corresponds mainly to the cutting edge form of the kinematic number of cutting edges, the cutting cross-section, the grain material, the workpiece material and the coolant conditions.

In CBN wheels a cutting ratio of $\mu = 0.36$ to 0.45 is assumed and the resultant load angle of the cutting edge $\alpha_b = \arctan \mu = 19.8°$ to 24.2°.

The greater the ratio of tangential force to normal force, the fewer the friction, shear and parting processes in the contact zone, indicating a sharp cutting edge condition with adjusted chip cavities. With careful adjustment of the grinding wheel specification and conditioning to the grinding process, it is possible to generate the topography of the grinding tool such that only very minor deviations of the initial cutting ratio occur from that in the stationary range.

As regards the tool, the following applies:

In order to design the specification, the roughness must first be taken into account that is specified in general for the respective grinding task. The roughness however depends partly on the specification of the CBN grinding tool and partly on the engagement conditions. In accordance with the process, the specification of the CBN grinding tool is selected on the basis of grain size and concentration, so that the set roughness requirement can be fulfilled under the kinematic and kinetic conditions, still to be explained. The specification of the grinding tool determines the initial effective surface roughness, which falls with small grain sizes and increasing concentration. A large grain and falling concentration increases the initial effective surface roughness.

For CBN grinding wheels available today, it is possible to give the following table of corresponding parameters:

| Grain size | Concentration | Initial effective surface roughness |
|---|---|---|
| B 64/B 91 | K(%) = 30 to 42 | $R_{tse}$ = 3.2 − 5.5 μm |
| B 126 | K(%) = 30 | $R_{tse}$ = 5.2 − 6.8 μm |
| B 181/B 252 | K(%) = 30 to 18 | $R_{tse}$ = 8.8 − 12.4 μm |

The grain size and the concentration of a CBN grinding wheel give the surface quality of the grinding tool, so that sufficient space is available between the peripheral CBN grains for the chips generated.

The type and hardness of the bond affects the grinding wheel topography and the break-away of the CBN grains from the bond (ceramic). With a harder bond the CBN crystals remain in the bond longer, so that first and foremost blunting of the cutting edges takes place in the grinding process. This results in a change not only in the grain form, but also in the number of cutting edges.

The type of bond of a grinding wheel specification depends on the grain density $C_K$, which is selected as the grain size for description of the grain number per mm$^3$ of grinding coating volume. The equation $$C_k = \frac{K}{1.3 \cdot q_m \cdot W_m^3} \text{ (mm}^{-3}\text{)} \quad [17]$$

with the value $q_m = 1.41$ for an octahedron represents the dependence on the mean grain diameter and the concentration. $W_m^3$ is here the theoretical volume of an octahedron.

In order to consider the grinding wheel topography, it is necessary to take into account the kinematic number of cutting edges per area, the chipped volume per cutting edge, the chip cavity volume and the chip cavity repletion degree. This creates the possibility of performing a theoretical adjustment between the volumes of the metal-cutting process on the one hand using the technology parameters, and of the tool on the other hand using the topography with a defined specification. At the same time, the workpiece wear is investigated, which results not only from altered grain geometry, but also from break-away of the grains under high grain load and unadjusted strength of the bonding material.

For the kinematic number of cutting edges per area, the following correlation can be described:

$$N_{kin} = 0.928 \left( \frac{K}{W_m^3} \right)^{0.598} \left( \frac{Q_w}{q\, d_{eq} \cdot v_c} \right)^{0.201} \cdot 10^6 \quad [18]$$

where K is the volume-based concentration, $w_m$ the mean mesh width for the grains, i.e. with an octahedron 1.42 times the grain diameter $d_k$, and finally q the speed ratio, as already set out beforehand. The kinematic number of cutting edges per area has the dimension mm$^{-2}$.

The single chip volume can be determined as a function of the cutting conditions and the grinding wheel specification using the equation $$V_{ES} = 4.32 \cdot \left( \frac{W_m^3}{K} \right)^{m1} \cdot (q \cdot d_{eq})^{n1} \cdot (Q_w'/v_c)^{p1} \text{ (μm}^3\text{)} \quad [19]$$

The single chip volume contains here the dimension μm$^3$, when the exponents are selected with $m_1 = 0.598$, $n_1 = 0.201$ and $p_1 = 0.798$, and $W_m$ is inserted in μm, $Q_w$ in mm$^3$/mms, $d_{eq}$ in mm and $v_c$ in m/s.

To determine the chip cavity volume, first the theoretical mean grain protrusion and the grain distance should be determined. The theoretical average grain protrusion between the peripheral grain peaks and the bonding material is given by the equation $$Z_{th} = 4.16 \cdot \left( \frac{W_m^3}{K} \right)^{m2} \cdot (d_k)^y \cdot q \cdot d_{eq}^{n2} \cdot \left( \frac{Q_w'}{v_c} \right)^{p2} \text{ (μm)} \quad [20]$$

where the exponents can be given with $m_2 = 0.05$, $y = 0.25$, $n_2 = 0.1$ and $p_2 = 0.4$.

The mean grain protrusion is then determined with the simplified relationship $$Z_r = 0.62 \cdot Z_{th} \text{ (μm)} \quad [21]$$

The grain distance can then be calculated by the equation $$l_k = \frac{2 \cdot (1.41 \cdot W_m^3)}{3 \cdot K \cdot d_k} \text{ (μm)} \quad [22]$$

The chip cavity volume is then obtained from the following:

$$V_{SR} = (l_k - Z_r 1.41) \cdot Z_r^2 \text{ (μm}^3\text{)} \quad [23]$$

The relationship between the single chip volume and the respective chip cavity volume is defined as the so-called chip cavity repletion degree $$f_g = \frac{V_{ES}}{V_{SR}} \quad [24]$$

The chip cavity repletion degree depends mainly on the material to be machined, when it is assumed that the specification and the topography are adjusted to the requirements of the cutting conditions. Depending on the material and on the material condition, the chips have various forms. In the actual grinding process, the chips require a greater chip cavity volume than their real volume. It may be deduced herefrom that the chip cavity repletion degree must not exceed a certain limit value, e.g. 0.75, in order to avoid overloading of the grinding coating.

In this respect, a radial grain wear is permitted, which is calculated using the equation $$r_s = (0.75 - f_g) \cdot \Delta b_s \cdot Z_r \; (\mu m) \quad [25]$$

where $\Delta b_s = 1.42$ corresponds to the grain protrusion factor.

The strength of the grinding tool is of great importance in plunge-grinding. If the radial wear exceeds a certain permitted dimension, the required form can only be generated again by conditioning (dressing). The conditioning interval is often used for assessment of the grinding process. It is given as the ratio of removed material volume to radial grinding wheel wear by the so-called grinding ratio, or designated as stock removal ratio G. The overall grinding wheel wear necessary for calculation of the stock removal ratio follows the equation:

$$V_{vs} = \pi \cdot d_s \cdot r_s \cdot b \cdot 10^{-3} \; (cm^3) \quad [26]$$

The chipped material volume within a conditioning interval can be calculated with the equation $$V_{WG} = V_w \cdot N_w \cdot b \cdot 10^{-3} \; (cm^3) \quad [27]$$

where $V_W$ is the chipped volume per workpiece, $N_W$ the number of machined workpieces per hour and $T_s$ the service interval between two conditioning operations.

The stock removal ratio is therefore $$G = \frac{V_{WG}}{V_{vs}} \quad [28]$$

As a result of grain blunting, the increased friction results in an increase of the single grain force $F_K$. In addition, the bond is more strongly eroded at the base of the grain at higher cutting capacities, which in its turn results in a reduction in the grain break-away force $F_{Kmax}$.

The load on the single grain is determined by the number of cutting edges onto which the cutting force is distributed as the result of grinding wheel specification and the process parameters.

The single grain force is calculated from $$Fk = \frac{F_c}{N_{kin} \cdot A_K} \; (N) \quad [29]$$

where $$A_k = l_g \cdot b \; (mm^2) \quad [30]$$

is the contact area.

The effective cutting edge distance $l_k$ and the engagement length are dependent on the infeed and cutting speed in addition to other influence quantities. The effect of the change in the kinematic quantities $v_s$ and $v_w$ on the chip thickness $a_n$ is represented by the equation $$an = a \cdot \frac{V_w}{V_s} \cdot \frac{l_k}{l_g} \quad [31]$$

If the grinding wheel peripheral speed is increased with constant engagement quantities, the result is decreasing chip thicknesses. The fact that fewer cutting edges are engaged does however reduce the overall cutting force. By reducing the contact time between grinding grain and workpiece at a high thermal conductivity of the grain, the contact zone temperatures can be reduced. The thermal conductivity of CBN grain is, for example, 700 W/m° C. and is substantially higher than that of conventional aluminium oxide.

The conditioning of the grinding wheel must be noted as a further process parameter.

It is known that grinding wheels lose both their original starting profile and their cutting capability as a result of wear. The result is a change in the grinding wheel topography as a function of the grinding time. The purpose of conditioning is to restore the topography of the grinding coating to its original form. Diamond contour rolls or sharpening bars are used as conditioning tools.

The conditioning parameters as regards the rotating diamond tool are the outline quantities profile shape, specification (grain density, settling pattern) and the setting quantities: infeed per conditioning operation, peripheral speed of roll, axial lateral feed and speed quotient.

If the degree of overlap is defined with $$V_d = a_{pd}/f_{ad} \quad [32]$$

as a quotient of effective width of the roll profile and lateral feed of the roll per grinding wheel revolution, these values for $V_d$ are between 1 and 6, so that the theoretical axial waviness $$Wat = \frac{f_{ad}^2}{8_{rp}} \quad [33]$$

is minimal.

The speed quotient $$qd = \frac{V_R}{V_S} \quad [34]$$

is the result of the peripheral speed of the diamond roll $V_R$ and the grinding wheel $V_S$. Changing rotation directions of the roll (up- and down-operation), the speed quotient and the axial lateral feed affect the initial surface roughness.

Now that the fundamental physical processes have been set forth in summarized form, an embodiment of the invention will now be explained in detail, in which a cutting value optimization is implemented on the basis of the above processes. This cutting value optimization has as its aim the comparison of theoretically derived correlations between the machining technology, the tool and the working result with determined equations, taking into account the output limit of the machine tool and the grinding tool. It is intended to calculate therefrom optimum metal removal rates for any infeed/-workpiece speed combinations, in order to achieve a minimum grinding time.

Figure 2:
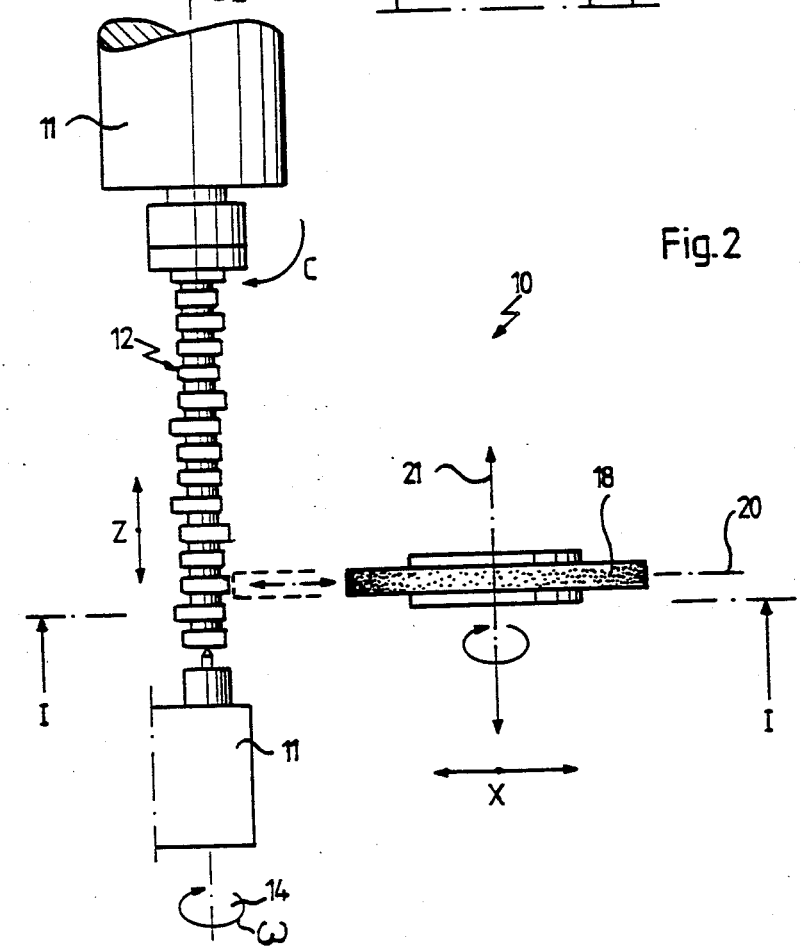
FIG. 2 is a plan view of the cam contour grinding machine shown in FIG. 1.

In FIGS. 1 and 2 a numerically controlled cam contour grinding machine is shown in highly simplified form and identified as a whole with the reference number 10.

In FIGS. 1 and 2 a numerically controlled cam contour grinding machine is shown in highly simplified form and identified as a whole with the reference number 10.

In a workpiece mounting 11 a camshaft 12 is clamped. The camshaft 12 is rotatable in defined angle steps by means of the rotating workpiece mounting 11 about its longitudinal axis 13, the so-called C-axis, as indicated by an arrow 14. The angular velocity of the workpiece mounting 11 is here identified with $\omega$. As a result of the actually present drives, only a certain maximum angular velocity $\omega_{max}$ is possible with the required precision of the rotary angle setting of the C-axis 13, and can vary in places over the cam contour, as will be shown below.

A grinding wheel slide 17 supports a grinding wheel 18 drivable by means of a drive motor 19. The power of the drive motor 19 is called P.

The grinding wheel slide 17 with grinding wheel 18 can be infed in defined X steps along an axis 20, the so-called X-axis vertical to the C-axis 13 of camshaft 12.

As FIG. 2 shows with the dashed line, it is possible in this way to move the grinding wheel 18 to the surface of cams of the camshaft 12 in order to machine this surface.

The grinding wheel 18 here revolves about its axis 21, which coincides with the so-called Z-axis. The grinding wheel slide 17 or the workpiece mounting 11 are additionally movable in the direction of the Z-axis 21, so that the grinding wheel 18 can machine the individual cams of the camshaft 12 one after the other.

It must be understood that the above description must only be taken as an example, and that the invention is not thereby restricted. For example, the invention can naturally also be used for those grinding machines where the axis of the grinding wheel is inclined to the workpiece axis, where the grinding wheel has a conical grinding surface instead of a cylindrical one, and the like.

In the cam contour grinding machine 10 according to FIGS. 1 and 2, an NC control unit 25 is provided to which input parameters 26 can be supplied. The NC control unit 25 derives therefrom control signals which are supplied via data lines 27 and 28 to the drive of the workpiece mounting 11 and to the drive of the grinding wheel slide 17. A distinction is made here between so-called "infeed mode" and so-called "path mode". In infeed mode the grinding wheel 18 is infed along the X-axis 20 onto camshaft 12 in order to achieve a certain stock removal during grinding. In path mode, by contrast, the grinding wheel 18 is adjusted along the X-axis 20 as a function of the respective rotary position of the camshaft 12 about the C-axis 13 in such a way that the engagement point or engagement line on the grinding surface of the grinding wheel 18 is always in contact with a required point of the cam contour of camshaft 12. By superimposing infeed mode and path mode, the cams of camshaft 12 can be ground along a spiral grinding path starting at the rough surface of the unmachined cam and ending on the contour of the finish-ground surface of the cam. These processes are known per se and for that reason do not need to be detailed here again.

Figure 3:
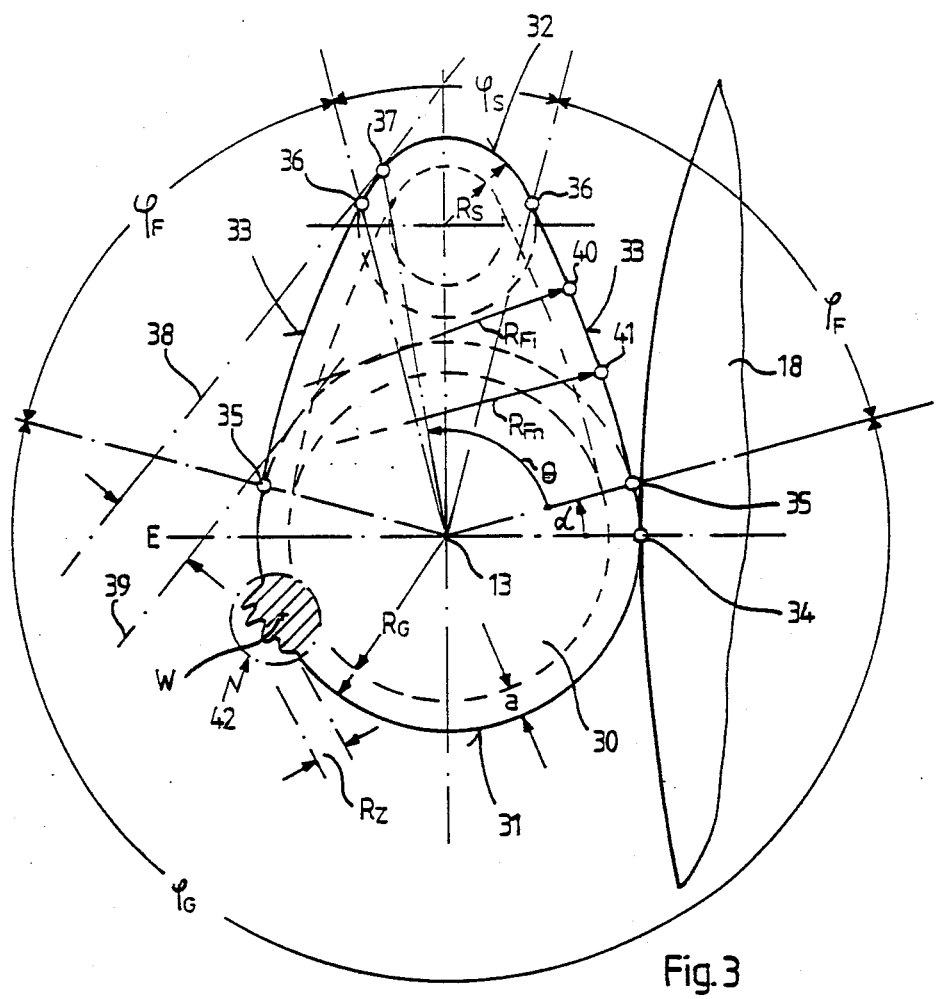
FIG. 3 is a detail, greatly magnified, of a cam being machined for the purpose of explaining various operating parameters.

FIG. 3 shows a cam 30 of the camshaft 12 with further details.

Cam 30 has a so-called base circle 31, a peak 32 and lateral flanks 33.

In a first point 34, the grinding wheel 18 attacks with its generating line the surface of cam 30. In the second points 35 the base circle 31 merges into the flanks 33. The second points 35 thus define the so-called base circle angle $\Theta_G$. The radius of the base circle is identified with $R_G$.

Third points 36 identify the transition from the flanks 33 to the peak 32. They thus define the so-called flank angle $\Theta_F$ and the peak angle $\Theta_S$. The radius of the peak is identified with $R_S$.

A fourth point 37 identifies any point, for example at peak 32, at which a tangent 38 contacts the cam contour. If a parallel tangent to tangent 38 is run to the base circle 31, the distance between the parallel tangents 38, 39 gives the so-called elevation value E.

With a fifth point 40 and a sixth point 41, random points on the contour of cam 30 are designated, shown using the example of two points on the flank 33. The curvature radii of points 40, 41 are designated with $R_{Fi}$ and $R_{Fn}$. This is intended to convey that the curvature radius with $R_{Fi}$ or $R_{Fn}$ in the areas of the flanks 33, i.e. above the flank angle $\Theta_F$, varies, while the curvature radius with $R_G$ in the area of base circle 31 above the base circle angle $\Theta_G$ is just as constant as with $R_s$ above the peak 31 or peak angle $\Theta_s$.

To define the cam contour analytically, various forms of tables can be set up. The contour of cam 30 can for example be shown as a table of polar coordinates, but forms of illustration are usual in which a so-called elevation value table is given that shows the elevation value E over an angle.

In both cases the table given for determining the path mode is converted, taking into account the grinding wheel diameter, into control instructions for the rotary angle of the C-axis 13 and the drive unit for the X-axis 20 of the grinding wheel slide 17.

In FIG. 3, a identifies the overmeasure by which the rough contour drawn with a solid line in FIG. 3 has to be ground off in order to obtain the finished contour drawn as a dashed line.

Finally, FIG. 3 shows in a section 42 in greatly magnified form the surface roughness $R_z$ which is to be generated by grinding on the surface of cam 30. In addition, W in section 42 indicates the material used.

The material identified with W is not a continually variable quantity. For the practical applications of the process in accordance with the invention, a limited number of materials can be given that are generally used as camshaft materials. These include in particular chilled cast iron, malleable cast iron and pearlitic cast iron, and it must also be taken into account whether these materials are case-hardened or inductively hardened. This finite number of possibilities can in practice be indicated by a finite number of code numbers selectable by the user of the process in accordance with the invention.

Figure 4:
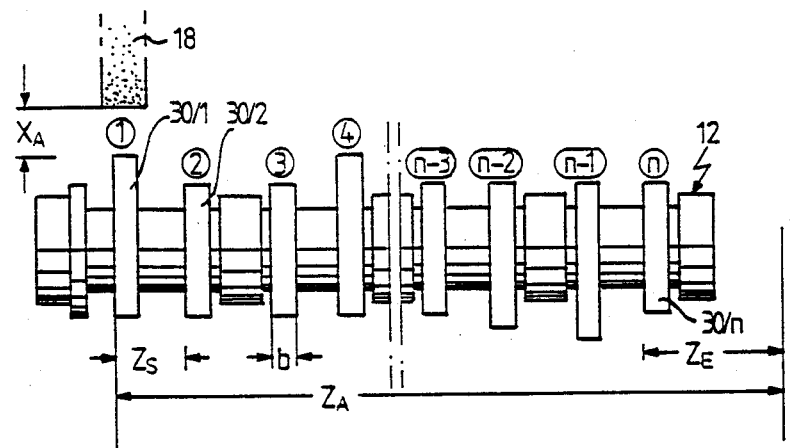
FIG. 4 is a side view onto a camshaft as can be machined using the process in accordance with the invention.

FIG. 4 shows a camshaft 12 such as can be machined using the process in accordance with the invention. The camshaft 12 has in the general illustration in FIG. 4 n cams 30/1, 30/2 . . . 30/n. Typically, camshafts with a total of 8 cams can be ground with the process in accordance with the invention.

At the start of the grinding process, the grinding wheel 18 can be set in the Z-axis such that it is opposite the first cam 30/1. The distance between the grinding wheel 18 and the first cam 30/1 in the X axis can be an initial value $X_A$. This value must be preset for the process in accordance with the invention so that the cam contour grinding machine can pass through this initial infeed path at the start of the operation before the grinding wheel 18 makes contact with the first cam 30/1.

In addition, the already mentioned initial setting of the grinding wheel 18 along the Z axis 21 must be preset for this purpose, and is shown by the initial dimension $Z_A$.

In the following machining operation of several cams 30/1, 30/2 ... it is then necessary for the so-called axial cam distance $Z_s$, i.e. the spacing of cams 30/1, 30/2 ... to be preset in the Z axis 21. Finally, the grinding wheel 18 reaches its axial limit position $Z_E$, also to be preset, after machining of the last cam 30/n.

To determine the process parameters the cam width b must also be entered.

Figure 5:
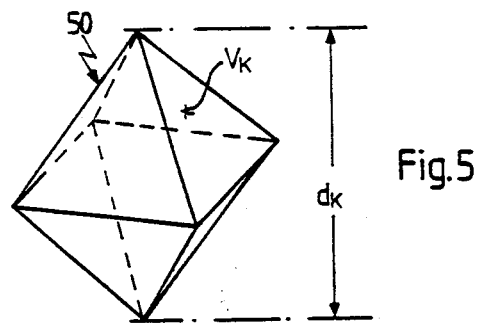
FIG. 5 shows in extremely magnified form a perspective view of an octahedric CBN grain as used in modern grinding wheels.

In order to illustrate the grinding wheel parameters, FIG. 5 first shows a CBN grain 50, i.e. a crystal of cubic boron nitride which is ideally in the form of an octahedron. The diameter of the CBN grain 50 is identified as $d_K$ and its volume as $V_K$.

Figure 6:
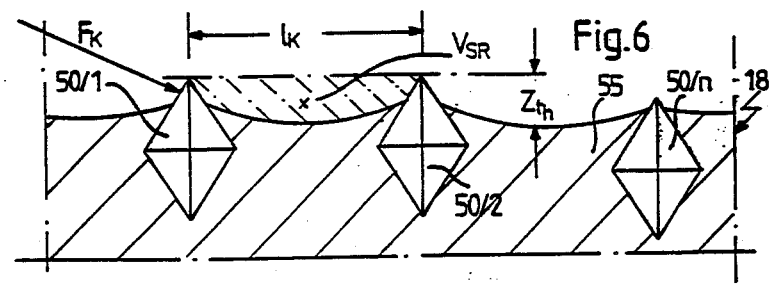
FIG. 6 is a partial view, in section and in greatly magnified scale, of a surface of a CBN grinding wheel.

As FIG. 6 shows, in a real grinding wheel 18 several of these grains 50, namely grain 50/1, 50/2 ... 50/n are bonded in a ceramic bond 55. The concentration of the grains 50 is designated here as K.

The distance between two grains 50/1 and 50/2 is taken as $l_K$ and the theoretical grain protrusion $Z_t$ as a statistical mean. The chip cavity volume $V_{SR}$ between two grains 50/1 and 50/2 can be determined herefrom.

In FIG. 6, $F_K$ shows the effective grain force acting on the grains 50/1 ... during grinding.

Figure 7:
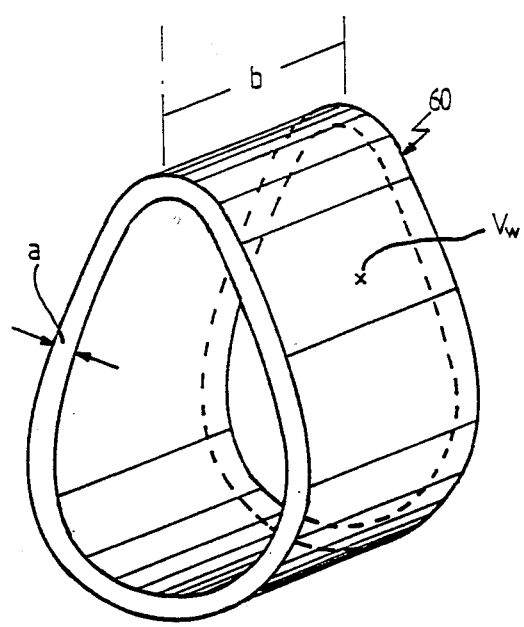
FIG. 7 is a perspective view to illustrate a chipped workpiece volume.

FIG. 7 shows in perspective a chipped volume 60 to make clear how stock is removed from a cam when an infeed a is set with a cam width b. As can easily be recognized from FIG. 7, the product $V_w$ is the product of infeed a, width b and the circumference of the cam, as explained below with FIG. 9.

Figure 8:
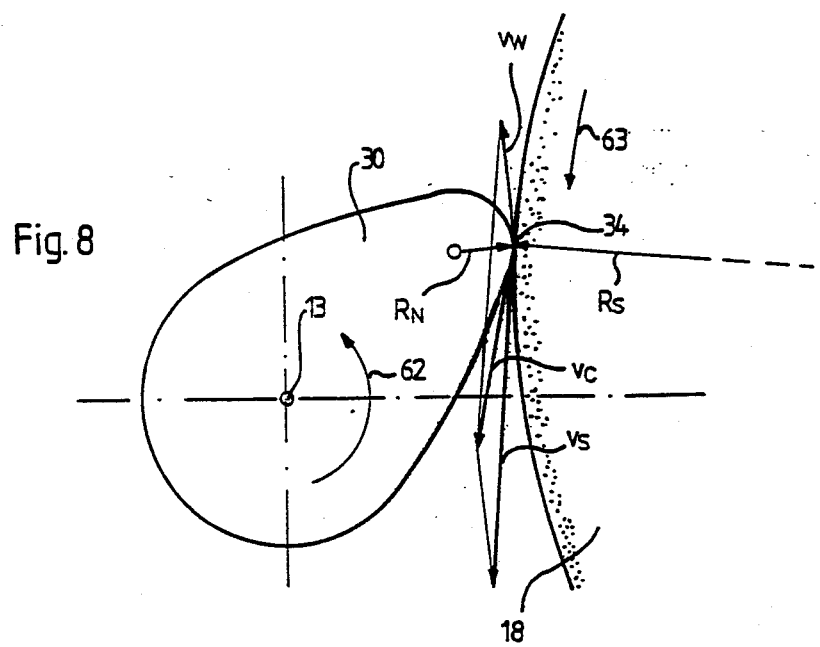
FIG. 8 is a view similar to FIG. 3, to illustrate the velocities of grinding wheel and cams effective in the process in accordance with the invention.

FIG. 8 shows the conditions with the effective speeds during cam contour grinding.

As indicated by arrows 62, 63, the cams 30 and therefore the grinding wheel 18 rotate in opposite directions. At the engagement point 34 the workpiece speed $v_w$ and the grinding wheel speed $v_s$, each shown as peripheral speeds, are effective. The directions of the speed vectors $v_w$ and $v_s$ are obtained from the respective radii $R_s$ of the grinding wheel 18 and $R_n$ of cam 30, as already explained above for cam 30 in FIG. 3.

The cutting speed $v_c$ is obtained from geometric addition of vectors $v_w$ and $v_s$ and can be calculated as to its amount with the aid of the cosine law.

Figure 9:
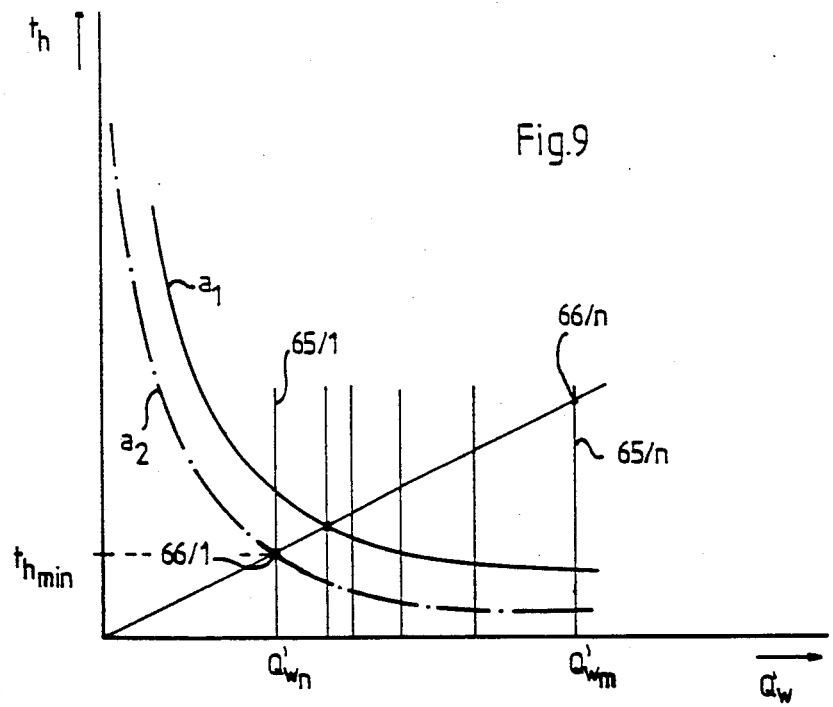
FIG. 9 is a diagram for illustrating boundary conditions as taken into account in the process in accordance with the invention.

FIG. 9 finally shows a diagram in which the grinding time $t_h$ for a cam is plotted using the relative metal removal rate $Q_w$.

It is known that the grinding time $t_h$ is equal to the quotient of chipped workpiece volume $V_w$ (cf. FIG. 7) and the relative metal removal rate $Q_w'$. The circumference of cam 30 is calculated as the sum of the products of circumference angles $\Theta$ and radii R, as given in FIG. 9 with the relationship $$L_n = \phi_G \cdot R_G + 2 \cdot \phi_F \cdot \sum_{K=1}^{n} R_{FK} \cdot K^{-1} + \phi_s \cdot R_s \quad [35]$$

Since the cam width b is constant, the chipped volume $V_w$ therefore depends only on the variable overmeasure a. The relationship between grinding time $t_h$ and relative metal removal rate $Q_w'$ is therefore expressed in a hyperbolic curve which is parameterized to a, as shown in FIG. 9 for two examples $a_1$ and $a_2$.

However, one is not free in the selection of the relative metal removal rate $Q_w'$, since the settable relative metal removal rate $Q_w'$ is limited by various process parameters.

These additional boundary conditions can—without claim to completeness—be explained as follows on the basis of empirically obtained functions:

A first boundary condition is the achievable surface roughness $r_t$ of the workpiece and $r_{t0}$ of the grinding wheel 18. With these two quantities and the concentration K of grinding wheel 18 and the cutting speed $v_s$, it is possible to illustrate as follows a first equation for a limit value of the relative metal removal rate $Q_w'$ $$Q_{w1}' = \left( \frac{R_t - R_{t0}}{K \cdot (V_c)^{-0.8}} \right)^{1.25} \quad [36]$$

As a second boundary condition, the outline error $f_m$ of the cam can be given, which is, as is well known, the quotient of cutting force $F_c$ and the system rigidity $C_g$. The result is the following relationship, taking into account cam width b:

$$Q_{w2}' = \frac{1}{b} \cdot \left( \frac{C_g \cdot v_c}{1.754} \right)^{2.78} (f_m)^{2.78} \quad [37]$$

with $$fm = \frac{F_c}{C_g} \quad [38]$$

As the third boundary condition, the tool wear $r_s$ as a function of the chip cavity repletion degree $f_g$, the grain lap factor $\Delta b_s$ and the theoretical grain protrusion $Z_r$, can be given as follows:

$$Q_{w3}' = 0.0391 \cdot \left( \frac{r_s}{(0.75 - f_g)Z} \right)^{2.5} \quad [39]$$

where Z is an auxiliary quantity and subject to the relationship $$Z = \left( \frac{W^{m3}}{K} \right)^{0.05} \cdot (d_k)^{0.25} \cdot (q \cdot d_{eq})^{0.1} \cdot \frac{1}{v_c}^{0.4} \quad [40]$$

The fourth boundary condition can be given as the temperature $T_M$, giving the equation:

$$Q_{w4}' = \left( \frac{T_M - T_R}{419.2 \cdot 10^3 \cdot \frac{K}{c}} \right)^{-1.563} \cdot \frac{1}{b} \quad [41]$$

As a further boundary condition, taking into account a drive power P of motor 19 of 22 kW, for example, and taking into account maximum angular velocities $_{max}$ of 10,000°/min in the elevation area and 30,000°/min on the base circle, are obtained the relationships:

$$Q_{ws}' = 1131.183 \cdot \frac{1}{b} \qquad [42]$$

as a function of the cam width b and the relationship $$Q_{w6}' = 0.694 \cdot V_w' \qquad [43]$$

as a function of the chipped workpiece volume.

In the illustration in FIG. 9, a range for the permissible values is drawn hatched, where straights $65/1 \ldots 65/n$ reproduce the boundary conditions $Q_w'$ set forth above and of which the intersections $66/1 \ldots 66/n$ are on a straight with the a hyperbolas.

Depending on which and how many of the above boundary conditions are to be taken into account, the limiting boundary condition to be taken into account is in each case that with the lowest relative metal removal rate $Q_w'$, in order to then determine the infeed a as a minimum but optimum value which then leads to the minimum grinding time $t_h$.

The control system provided for implementation of the process in accordance with the invention will now be explained on the basis of the flow diagram in FIGS. 10/1 to 10/12.

In a first block 70, a determining program is started by first either individually presetting or calling from machine-specific files the input data in a block 71.

As grinding machine data, the maximum power $P_{max}$ of the drive motor 19 of the grinding wheel 18 of 22 kW, for example, is called. Next, the maximum angular velocities of the workpiece mounting 11 of C-axis 13 are called, which can be between 10,000° and 30,000°/min. Finally the rigidity $C_g$ of the machine is taken into account.

As cam data, first the material W is called on the basis of the already mentioned table of typical camshaft materials. In addition, the total overmeasure A and the number of cams n of the camshaft are preset. As regards the cam contour, the base circle radius $R_G$ and the contour itself, for example in the form of the already mentioned elevation value table $E(\theta)$ must be preset. The cam width b must be entered and also the initial infeed distance $X_A$ of the grinding wheel 18 in the direction of X-axis 20, the initial position $Z_A$ of grinding wheel 18 in the direction of the Z-axis 21, and the final position $Z_E$ in this axis 21 and the axial cam distance $Z_S$.

As cam specifications, the surface roughness $R_z$ and the outline error $f_m$ are preset. As regards thermal edge zone influence, symbolized by $\Theta_{RZ}$ the user can make a yes/no decision with J/N, which has the effect that the further determination of the parameters is implemented with or without account being taken of the thermal edge zone phenomenon.

The grinding wheel data are also preset in tabular form, for a finite number of CBN grinding wheels available in practice. For each of these grinding wheels the grinding wheel diameter $d_s$ and the grain size B and concentration K can be given in the known manner. A polyhedron constant $q_m$, which is 1.4 in the case of an octahedron, is also preset, as is the theoretical polyhedron volume $W_m$, which can also be preset in table form in the manner of a polyhedron, in the event that differing polyhedrons are provided for different grinding wheel coatings.

Furthermore, the grain lap factor $\Delta b_s$, the permissible maximum grain force $F_{Kzul}$ for the grinding wheel and, as conditioning parameter, the dressing infeed $a_d$ and the speeds of the dressing roll $v_{fd}$, $v_{fd}'$ in the opposite direction must be preset.

The grinding wheel peripheral speed $v_s$, the number of workpieces to be machined per hour $N_w$ and finally the conditioning interval of the grinding wheel $T_s$ must be given as constant machining parameters.

Finally, numerous constants are required in the course of the process in accordance with the invention which have mainly been obtained empirically and can therefore fluctuate within certain limits. In the further explanation of the process in accordance with the invention, these constants are given as concrete numerical values, although it must be understood that these numerical values can be subject to certain fluctuations for the reasons stated.

From the input quantities given in block 71, the cam geometry is first calculated in block 72 on the basis of further characteristic values. The workpiece diameter $d_w$, the flank radius $R_F$ in the form of a table, the peak radius $R_S$, the maximum elevation value $E_{max}$ and the base circle angle $\Theta_G$, flank angle $\Theta_F$ and peak angle $\Theta_S$ are determined.

The cam peripheral speed $v_w$ is now calculated in block 73 as a function of the elevation table and the maximum angular velocity of the C-axis 13.

In block 74, the cutting speed $v_c$ of the grinding wheel 18 is determined using the cosine law in a vectorial addition process from the cam peripheral speed $v_w$ and the grinding wheel speed $v_s$.

In block 75 the values $R_G$, $R_F$, $R_S$, $E_{max}$, $\Theta_G$, $\Theta_F$, $\Theta_S$, b, $X_A$, $Z_A$, $Z_E$ and $Z_S$ are output in the form of a graphic interactive dialog with the user of the process in accordance with the invention with the menu technology mentioned at the outset. For this purpose, the camshaft can be shown in two side views in one mask, with the values listed for block 75 being shown graphically.

Parallel to the output in block 75, the ratio of cutting speed $v_c$ and workpiece speed $v_w$ is calculated as quotient q in block 75.

In block 77, an effective diameter $d_{eq}$ is determined as an auxiliary quantity from the diameters of workpiece $d_w$ and grinding wheel $d_s$.

In block 78 the cutting force $f_c$ is determined on the basis of an empirical formula from the maximum power $P_{max}$ of the drive motor 19.

With the aid of the relationship already given and explained in FIG. 9, the theoretically minimum grinding time $t_h$ is determined in block 79 from the cam geometry and the achievable angular velocities $\omega$.

From this, the maximum relative metal removal rate $Q'_{wmax}$ is determined as the central quantity of the process in accordance with the invention using an empirically obtained formula from the maximum power $P_{max}$ of the drive motor 19 of grinding wheel 18.

The maximum chipped workpiece volume $V'_{wmax}$ can be determined from the values so obtained in blocks 79 and 80.

With the aid of the complete relationship set forth and explained in FIG. 9, a maximum infeed $a_{max}$ for grinding wheel 18 is now determined in block 82 as the initial quantity for the process in accordance with the invention.

This maximum infeed $a_{max}$ is now checked in further operation as to whether it is permissible as regards various restrictions of the system in use.

To achieve this, the maximum relative metal removal rate $Q'_{wi}$ is preset again as the maximum value $Q'_{wmax}$ in a block 83 as the central calculation quantity.

As indicated in block 84, this maximum initial value $Q'_{wmax}$ can be further decremented in the following procedure by various grinding operations, as will be explained in detail below.

In the first process loop, a certain grinding wheel type is selected in block 85 from the preset surface roughness $R_z$ for the finish-machined cam surface using the grinding wheel table, with this grinding wheel permitting the stated surface roughness $R_z$ to be achieved. The grain size B and the concentration K and therefore the grain diameter $d_k$ too are fixed.

The determined grinding wheel type is output in block 86 and again inserted into the graphic interactive dialog of the menu control.

The further process is now implemented on the basis of equations (1) to (42), which are detailed above. Reference is made to these equations in the following.

In block 87, the grain density $C_K$ is calculated with the aid of equation (17).

In block 88, the kinematic number of cutting edges per area $N_{kin}$ is calculated with the aid of equation (18).

In block 89, the single chip volume $V_{ES}$ is calculated with the aid of equation (19).

In block 90, the theoretical grain protrusion $Z_{th}$ is calculated therefrom with the aid of equation (20).

With the aid of equation (21), the real grain protrusion $Z_r$ is obtained in block 91, and with the aid of equation (22) the grain distance $l_k$ is obtained therefrom in block 92 and finally the chip cavity volume $V_{SR}$ in block 93 with the aid of equation (23).

Finally, the chip cavity repletion degree $f_g$ can be determined in block 94 with the aid of equation (24).

In the decision block 95, a check is now made as to whether the chip cavity repletion degree $f_g$ is smaller than or equal to a given limit value of, for example, 0.75. If this is not the case, i.e. if the chip cavity volume $V_{SR}$ is not large enough to take in all the single chips with the single chip volume $V_{ES}$, the initial quantity of this process loop, i.e. the relative metal removal rate $Q'_{wi}$ is decremented via a block 96 by a preset amount $Q'_w$. With this decremented value the process reverts back to point 84 already explained, behind block 83, in order to implement the process steps explained above until the relative metal removal rate $Q'_{wi}$ is decremented enough for the chip cavity repletion degree to be adequately dimensioned.

As soon as this is the case, the process continues and calculates in block 97 the grain wear factor $r_s$ with the aid of equation (25).

With the aid of equation (26), the total wear $V_{VS}$ is then calculated in block 98, and using equation (27) the chipped workpiece volume $V_{WG}$ is determined in block 99.

From this is obtained in block 100, with the aid of equation (28) the stock removal ratio G and, in block 101, using equation (5), the contact length $l_g$.

In block 102, the contact area $A_K$ is calculated using equation (30) and in block 103 the single grain force $F_K$ using equation (29).

A check is now made in decision block 104 as to whether the single grain force $F_K$ is smaller than or equal to a permissible single grain force $F_{Kzul}$. If this is not the case, in other words if the load on the individual grain is too high, the relative metal removal rate $Q'_{wi}$, the central process quantity, is again decremented in block 105 by the amount $\Delta Q'_{wi}$, with the decrement amount $\Delta Q'_{wi}$ being equal to that of block 96 or able to be redimensioned. In this case too, the program reverts via the loop to point 84 in order to continue calculation with the decremented value for $Q'_{wi}$ until the single grain force $F_K$ has dropped to the permissible value $F_{Kzul}$.

It should be added at this juncture that the two process loops explained above must be understood as options by which the process can be operated. It is therefore quite possible—as already mentioned—to break off the process described above as early as block 85 and to use the grinding wheel determined there, although in this instance neither the chip cavity degree conditions nor the single grain load conditions are taken into account. If on the other hand the process is continued, first the chip cavity repletion conditions are taken into account up to block 95, at which point the process in accordance with the invention can be alternatively broken off. The relative metal removal rate $Q_w'$ determined at the yes-output of block 95 can then be converted in blocks 81 and 82 to a maximum infeed $a_{max}$ of grinding wheel 18, which is then by its very nature smaller than the amount determined in the first run of the process in accordance with the invention at the output of block 82.

If the camshaft 12 is now ground using grinding wheel 18 with setting of the infeed a thus reduced once only, then the restriction given in block 80 as regards the maximum power $P_{max}$ of the drive motor 19 of the grinding wheel 18 on the one hand, and the restriction regarding to chip cavity repletion conditions of block 94 on the other, are complied with.

If however the process in accordance with the invention is also run through the second loop up to block 104, and the twice-decremented relative metal removal rate $Q_w'$ at the output of block 104 is taken as a basis for determination of an accordingly twice-reduced overmeasure a, this presetting leads in real grinding of a camshaft to a grinding that takes into account the restriction of the single grain load in addition.

It is understood here that as restrictions are taken progressively into account, and the relative metal removal rate $Q_w'$ as well as infeed a is progressively reduced, an increase in the grinding times $t_h$ also occurs.

Similar considerations apply for the restrictions given below, which can be taken into account additionally, either singly or in any combination to choice.

In block 106, the surface roughness is taken as the restriction criterion with the aid of equation (36) and a value for the relative metal removal rate $Q'_{wi}$ is calculated therefrom. In the decision block 107 a check is now made as to whether the value $Q_{wi}'$ so determined is larger than or equal to the current process value $Q'_{wi}$ determined after running the process to block 83 and possibly to block 95 and/or to block 104.

If it proves here that the newly determined value $Q'_{wi}$ is smaller, this new value $Q_{wi}'$ must be preset via block 108 as a new process parameter for $Q_{wi}'$ if the surface roughness is to be taken into account as a restriction criterion.

If however it turns out that the newly determined value $Q'_{wi}$ is greater than the current $Q_{wi}'$, the restriction criterion of surface roughness can be passed over, since its effects are within the process parameter range already taken into account.

To take into account the next restriction criterion of the outline error $f_m$, the latter must first be calculated in block 109 with the aid of equation (38). In block 110 the next restriction criterion is calculated with the aid of equation (37) and a decision is again made using blocks 111 and 112, as already described for blocks 107, 108.

In block 113 tool wear $r_s$ is taken into account as the next restriction criterion with the aid of equation (39), and a decision is again made using blocks 114, 115.

In block 116, the temperature $T_M$ is taken into account as the next restriction criterion using equation (41) and the appropriate decision is made in blocks 117, 118.

Block 119 determines as the next restriction criterion, using equation (42), the machine data with the subsequent decision in blocks 120, 121, and in similar manner block 122 calculates using equation (43) a further restriction criterion on the basis of machine data with subsequent decision in blocks 123 and 124.

In the following block 125, grinding wheel-specific values $d_s$, $W_m$, $K$, $d_k$, $Z_{th}$, $l_g$ and $V_{SR}$ are now displayed in the graphic interactive dialog of the menu control for grinding wheel selection.

This applies correspondingly in block 125 for the output of values for grinding wheel conditioning, where, for example, the values $a_d$, $v_{fd}$, $v'_{fd}$, $q$, $r_s$, $T_s$, $G$, $N_{kin}$, $V_{ES}$, $f_g$ and $F_K$ are displayed in the graphic interactive dialog.

Finally, in block 127 the preselected material W and, for the grinding wheel type, the values $v_c$, $\omega$, $V_{WG}$, $Q'_{wimax}$, and $t_h$ or, taking into account the travel distances of the grinding wheel in the Z and X direction (without machining) the total grinding time, are given as machining parameters.

The determination of the process parameters to be taken into account then ends in block 128 and the determined values are now transmitted as operating parameters for the cam contour grinding machine 10 into the NC control unit 25 or its output interfaces of data lines 27 and 28, in order to now grind the cams 30 of camshaft 12 in the determined form.

I claim:

1. A method of grinding cams of a camshaft by means of a numerically controlled camshaft grinding machine, with said camshaft being arranged in a workpiece mounting device to rotate said camshaft about a longitudinal axis thereof at a predetermined angular velocity ($\omega$) in predetermined angular steps ($\theta$), with a grinding wheel slide having a rotatable grinding wheel mounted thereon and being infeedable in predetermined steps in an axis perpendicular to said longitudinal axis, said grinding wheel being selected from a given set of grinding wheels with respect to its machining properties as well as said infeed (a) being set as a function of a geometry, a material and a required surface condition of said camshaft and cams, the method comprising the steps of:

determining a minimum grinding time ($t_{hmin}$) from said geometry of said cams and from a maximum value of said angular velocity ($\omega_{max}$);

determining a first maximum value of a relative chipping rate ($Q'_{wmax}$) as a function of a maximum machine power ($P_{max}$) of a grinding wheel drive;

determining a maximum chipped workpiece volume ($V'_{wmax}$) from said minimum grinding time ($t_{hmin}$) and from said maximum relative chipping rate ($Q'_{wmax}$);

determining a maximum infeed ($a_{max}$) from said maximum chipped workpiece volume ($V'_{wmax}$) and from said geometry of said cams;

determining a grinding wheel type from a table of given grinding wheel types as a function of a predetermined surface roughness ($R_z$) of said cams;

grinding of said cams by means of said predetermined grinding wheel while setting said maximum infeed ($a_{max}$).

2. The method of claim 1, comprising the further steps of:

determining a chip cavity repletion degree ($f_g$) from said maximum relative chipping rate ($Q'_{wmax}$);

comparing said determined chip cavity repletion degree ($f_g$) with a threshold value ($K_{11}$);

reducing said maximum relative chipping rate ($Q'_{wmax}$) until said chip cavity repletion degree ($f_g$) does not fall below said limit value ($K_{11}$);

determining a corresponding maximum infeed ($a_{max}$) from said reduced maximum relative chipping rate ($Q'_{wmax}$);

grinding said cams using said predetermined grinding wheel while setting said maximum infeed ($a_{max}$).

3. A method of claim 2, comprising the further steps of:

determining a single grain force ($F_k$) from said maximum relative chipping rate ($Q'_{wmax}$);

comparing said determined single grain force ($F_k$) with a threshold value ($F_{kzul}$);

reducing said maximum relative chipping rate ($Q'_{wmax}$) until said single grain force ($F_k$) does not fall below said threshold value ($F_{kzul}$);

determining a corresponding maximum infeed ($a_{max}$) from said reduced maximum relative chipping rate ($Q'_{wmax}$);

grinding said cams using said determined grinding wheel while setting said maximum infeed ($a_{max}$).

4. The method of claim 1, wherein a second maximum value of a chipping rate ($Q_w'$) is determined from a further boundary condition, the greater of said first or second values of said chipping rate ($Q_w'$) being used for determining said maximum infeed ($a_{max}$) and for grinding said cams.

5. The method of claim 4, wherein said further boundary condition is said surface roughness ($R_z$, $R_t$) of said cams and said grinding wheel, respectively.

6. The method of claim 4, wherein said further boundary condition is an outline error ($f_m$) of said cam geometry.

7. The method of claim 4, wherein said further boundary condition is a cutting power (P) of said camshaft grinding machine.

8. The method of claim 4, wherein said further boundary condition is a wear rate ($r_s$) of said grinding wheel.

9. The method of claim 4, wherein said further boundary condition is an edge zone temperature ($T_M$, $T_R$) of said cams.

10. The method of claim 4, wherein said further boundary condition is a chipped workpiece volume ($V_W$).

* * * * *